United States Patent
Lo

(10) Patent No.: US 9,134,113 B2
(45) Date of Patent: Sep. 15, 2015

(54) POSITION IDENTIFICATION SYSTEM AND METHOD AND SYSTEM AND METHOD FOR GESTURE IDENTIFICATION THEREOF

(71) Applicant: GENERALPLUS TECHNOLOGY INC., Hsinchu (TW)

(72) Inventor: Li Sheng Lo, Zhubei (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 259 days.

(21) Appl. No.: 13/874,071

(22) Filed: Apr. 30, 2013

(65) Prior Publication Data

US 2014/0048709 A1    Feb. 20, 2014

(30) Foreign Application Priority Data

Aug. 15, 2012  (TW) .............................. 101129455 A

(51) Int. Cl.
 *G01J 5/02* (2006.01)
 *G01B 11/00* (2006.01)
 *G06F 3/01* (2006.01)

(52) U.S. Cl.
 CPC .............. *G01B 11/002* (2013.01); *G06F 3/011* (2013.01)

(58) Field of Classification Search
 CPC ........ G06F 3/017; G06F 3/0421; G06K 9/209
 See application file for complete search history.

(56) References Cited

U.S. PATENT DOCUMENTS

| 2010/0245289 | A1* | 9/2010 | Svajda .......................... 345/175 |
| 2012/0312956 | A1* | 12/2012 | Chang et al. ............... 250/201.1 |
| 2013/0249861 | A1* | 9/2013 | Chang et al. .................. 345/174 |

\* cited by examiner

*Primary Examiner* — David J Makiya
*Assistant Examiner* — Kenneth J Malkowski
(74) *Attorney, Agent, or Firm* — Muncy, Geissler, Olds & Lowe, P.C.

(57) ABSTRACT

The present invention relates to a position identification system and a method for gesture identification thereof. The method for gesture identification does not use the conventional digital image capture method, instead, the method uses IR detection. In order to accurately detect the movement track of the external object, in the present invention, at least two IR LED are provided. When the first IR LED emits the IR ray signal, the second IR LED is used for receiving IR ray signal. Moreover, the present invention determines the distance between the external object and the IR LEDs by detecting the emitting IRs with different energy. Further, the present invention adopts TDM (Time Division Multiplexing) such that the present invention can grasp the distance between the first IR LED and the external object and the distance between the second IR LED and the external object. Thus, the relative position of the external object can be captured.

48 Claims, 24 Drawing Sheets

POSITION IDENTIFICATION SYSTEM AND METHOD AND SYSTEM AND METHOD FOR GESTURE IDENTIFICATION THEREOF

This application claims the benefit of TW Application No. 101129455 filed on Aug. 15, 2012, the content of which is hereby incorporated by reference.

BACKGROUND OF THE INVENTION

1. Field of Invention

The present invention relates in general to the technology of the gesture identification, and more particularly to a system and a method for gesture identification by using IR detection instead of digital camera and digital image process.

2. Related Art

Gesture is quite original and natural way of communication. Therefore, Gesture is the one of the most common way of communication between people during daily life. As development of the visual image detection, the interactive gesture control, the binocular depth identification, the augmented reality, the discussion of the physical interaction has already spread all over the world. Also, the value of output in the application of physical interaction is greatly increased.

General speaking, the gesture identification in the conventional art uses image process such that the computer or the electrical product can identify the different gestures. FIG. 1A illustrates a flow chart depicting the method for gesture identification in the conventional art. Referring to FIG. 1A, the method for gesture identification includes the steps of:

In step S101, the method starts.

In step S102, the digital image is captured. Generally speaking, in the method for gesture identification in the conventional art, the digital camera for recording digital video to capture the digital image is necessary.

In step S103, a skin tone filtering is performed. The captured digital image would be performed a skin tone analysis. After that, the face and hand(s) would be reserved and residual would be removed such that the follow-up hand capture becomes easier.

In step S104, the identification for hand's contours is performed. Because of the step S103, the processed image would become a image only with black and white, the hand's contours can be easily determined. As shown in FIG. 1B, FIG. 1B illustrates the schematic of hand's contours capturing by the image process of the conventional art.

In step S105, motion detection is performed to determine the gesture. Because of the prior steps, the pixels of the processed image are dualization. The digital process would be relatively easier.

In step S106, the method ends.

However, the method described above needs a plurality of digital image process and digital operation. With regard to a product with hardware limitation which cannot performs the high level operation, it is impossible to implement the gesture detection as above.

As such, applicants modified the gesture detection to increase the flexibility in the application of product.

SUMMARY OF THE INVENTION

It is therefore a first objective of the present invention to provide a position identification system, to detect the distance between the external object and the IR source by emitting the IR signal with different intensities to further determine the position of the external object.

It is therefore a second objective of the present invention to provide a gesture identification system. The gesture identification can be performed without digital camera and digital image process.

It is therefore a third objective of the present invention to provide a gesture identification method by using infrared technology. The method does not need a complex operation, such as digital image process, image capture.

A position identification system is provided in the present invention. The position identification system includes a first infrared light emitting diode, a first infrared light emitting diode and a control circuit. The control circuit is coupled to the first infrared light emitting diode and the first infrared light emitting diode. During a first period, the control circuit controls the first infrared light emitting diode to emit a plurality of infrared rays with different intensities, and controls the second infrared light emitting diode to enter a receiving mode to serve as an infrared receiver. The first period is divided into P sub-periods, wherein the first infrared light emitting diode emits the infrared ray with $i^{th}$ intensity during the $i^{th}$ sub-period. When the second infrared light emitting diode detects a reflected infrared ray from an external object during the $j^{th}$ sub-period in the first period, the control circuit determines the distance between the first infrared light emitting diode and the external object in accordance with $j^{th}$ intensity of the infrared ray emitted by the first infrared light emitting diode.

During a second period, the control circuit controls the second infrared light emitting diode to emit a plurality of infrared rays with different intensities, and controls the first infrared light emitting diode to enter the receiving mode to serve as the infrared receiver. The second period is divided into Q sub-periods, wherein the second infrared light emitting diode emits the infrared ray with $k^{th}$ intensity during the $k^{th}$ sub-period. When the first infrared light emitting diode detects the reflected infrared ray from the external object during the $m^{th}$ sub-period in the second period, the control circuit determines the distance between the second infrared light emitting diode and the external object in accordance with $m^{th}$ intensity of the infrared ray emitted by the second infrared light emitting diode. The control circuit determines the position of the external object in accordance with the distance between the first infrared light emitting diode and the external object and the distance between the second infrared light emitting diode and the external object, wherein i, j, k, m, P, Q are nature numbers, and $0 \leq i$, $j \leq P$, $0 \leq k$, $m \leq Q$.

A gesture identification system is also provided in the present invention. The gesture identification system includes a first infrared light emitting diode, a first infrared light emitting diode and a control circuit. The control circuit is coupled to the first infrared light emitting diode and the first infrared light emitting diode. During a first period, the control circuit controls the first infrared light emitting diode to emit a plurality of infrared rays with different intensities, and controls the second infrared light emitting diode to enter a receiving mode to serve as an infrared receiver. The first period is divided into P sub-periods, wherein the first infrared light emitting diode emits the infrared ray with $i^{th}$ intensity during the $i^{th}$ sub-period. When the second infrared light emitting diode detects a reflected infrared ray from an external object during the $j^{th}$ sub-period in the first period, the control circuit determines the distance between the first infrared light emitting diode and the external object in accordance with $j^{th}$ intensity of the infrared ray emitted by the first infrared light emitting diode.

During a second period, the control circuit controls the second infrared light emitting diode to emit a plurality of infrared rays with different intensities, and controls the first infrared light emitting diode to enter the receiving mode to serve as the infrared receiver. The second period is divided into Q sub-periods, wherein the second infrared light emitting diode emits the infrared ray with $k^{th}$ intensity during the $k^{th}$ sub-period. When the first infrared light emitting diode detects the reflected infrared ray from the external object during the $m^{th}$ sub-period in the second period, the control circuit determines the distance between the second infrared light emitting diode and the external object in accordance with $m^{th}$ intensity of the infrared ray emitted by the second infrared light emitting diode. The control circuit determines the position of the external object in accordance with the distance between the first infrared light emitting diode and the external object and the distance between the second infrared light emitting diode and the external object. The control circuit collects a plurality of distances between the first infrared light emitting diode and the external object and a plurality of distances between the second infrared light emitting diode and the external object to determine a movement track of the external object, and then the control circuit determines a gesture in accordance with the movement track of the external object, wherein i, j, k, m, P, Q are nature numbers, and $0 \le i, j \le P, 0 \le k, m \le Q$.

A position identification method is also provided in the present invention. The position identification method includes the steps of: providing a first infrared light emitting diode; providing a second infrared light emitting diode; controlling the first infrared light emitting diode to emit a plurality of infrared rays with different intensities during a first period; controlling the second infrared light emitting diode to enter a receiving mode to serve as an infrared receiver during the first period, wherein the first period is divided into P sub-periods, wherein the first infrared light emitting diode emits the infrared ray with $i^{th}$ intensity during the $i^{th}$ sub-period; determining the distance between the first infrared light emitting diode and the external object in accordance with $j^{th}$ intensity of the infrared ray emitted by the first infrared light emitting diode, when the second infrared light emitting diode detects a reflected infrared ray from an external object during the $j^{th}$ sub-period in the first period; controlling the second infrared light emitting diode to emit a plurality of infrared rays with different intensities during the second period; controlling the first infrared light emitting diode to enter the receiving mode to serve as the infrared receiver during the second period, wherein the second period is divided into Q sub-periods, wherein the second infrared light emitting diode emits the infrared ray with $k^{th}$ intensity during the $k^{th}$ sub-period; determining the distance between the second infrared light emitting diode and the external object in accordance with $m^{th}$ intensity of the infrared ray emitted by the second infrared light emitting diode, when the first infrared light emitting diode detects the reflected infrared ray from the external object during the $m^{th}$ sub-period in the second period; determining the position of the external object in accordance with the distance between the first infrared light emitting diode and the external object and the distance between the second infrared light emitting diode and the external object; collecting a plurality of positions of the external object to determine a movement track of the external object; and determining a gesture in accordance with the movement track of the external object, wherein i, j, k, m, P, Q are nature numbers, and $0 \le i, j \le P, 0 \le k, m \le Q$.

A gesture identification method is also provided in the present invention. The gesture identification method includes the steps of: providing a first infrared light emitting diode; providing a second infrared light emitting diode; controlling the first infrared light emitting diode to emit a plurality of infrared rays with different intensities during a first period; controlling the second infrared light emitting diode to enter a receiving mode to serve as an infrared receiver during the first period, wherein the first period is divided into P sub-periods, wherein the first infrared light emitting diode emits the infrared ray with $i^{th}$ intensity during the $i^{th}$ sub-period; determining the distance between the first infrared light emitting diode and the external object in accordance with $j^{th}$ intensity of the infrared ray emitted by the first infrared light emitting diode, when the second infrared light emitting diode detects a reflected infrared ray from an external object during the $j^{th}$ slab-period in the first period; controlling the second infrared light emitting diode to emit a plurality of infrared rays with different intensities during the second period; controlling the first infrared light emitting diode to enter the receiving mode to serve as the infrared receiver during the second period, wherein the second period is divided into Q sub-periods, wherein the second infrared light emitting diode emits the infrared ray with $k^{th}$ intensity during the $k^{th}$ sub-period; determining the distance between the second infrared light emitting diode and the external object in accordance with $m^{th}$ intensity of the infrared ray emitted by the second infrared light emitting diode, when the first infrared light emitting diode detects the reflected infrared ray from the external object during the $m^{th}$ sub-period in the second period; determining the position of the external object in accordance with the distance between the first infrared light emitting diode and the external object and the distance between the second infrared light emitting diode and the external object; collecting a plurality of positions of the external object to determine a movement track of the external object; and determining a gesture in accordance with the movement track of the external object, wherein i, j, k, m, P, Q are nature numbers, and $0 \le i, j \le P, 0 \le k, m \le Q$.

In accordance with the exemplary embodiments of the present invention, the system further includes a third infrared light emitting diode. The third infrared light emitted diode, the second infrared light emitted diode and the first infrared light emitted diode are disposed as a triangle. During the first period, the control circuit controls the first infrared light emitting diode to emit the plurality of infrared rays with different intensities, and the control circuit controls the second infrared light emitting diode and the third infrared light emitting diode to enter the receiving mode to serve as infrared receivers during the first period. The first period is divided into P sub-periods, wherein the first infrared light emitting diode emits the infrared with $i^{th}$ intensity during the $i^{th}$ sub-period.

When the second infrared light emitting diode and/or the third infrared light emitting diode detects the reflected infrared ray from the external object during the $j^{th}$ sub-period in the first period, the control circuit determines the distance between the first infrared light emitting diode and the external object in accordance with $j^{th}$ intensity of the infrared ray emitted by the first infrared light emitting diode.

During the second period, the control circuit controls the second infrared light emitting diode to emit a plurality of infrared rays with different intensities, and controls the first infrared light emitting diode and the third infrared light emitting diode to enter the receiving mode to serve as the infrared receivers. The second period is divided into Q sub-periods, wherein the second infrared light emitting diode emits the infrared ray with $k^{th}$ intensity during the $k^{th}$ sub-period.

When the first infrared light emitting diode and/or the third infrared light emitting diode detects the reflected infrared ray from the external object during the $m^{th}$ sub-period in the second period, the control circuit determines the distance between the second infrared light emitting diode and the external object in accordance with $m^{th}$ intensity of the infrared ray emitted by the second infrared light emitting diode.

During a third period, the control circuit controls the third infrared light emitting diode to emit a plurality of infrared rays with different intensities, and controls the first infrared light emitting diode and the second infrared light emitting diode to enter the receiving mode to serve as the infrared receivers. The third period is divided into R sub-periods, wherein the third infrared light emitting diode emits the infrared ray with $n^{th}$ intensity during the $n^{th}$ sub-period.

When the first infrared light emitting diode and/or the second infrared light emitting diode detects the reflected infrared ray from the external object during the $s^{th}$ sub-period in the third period, the control circuit determines the distance between the third infrared light emitting diode and the external object in accordance with $s^{th}$ intensity of the infrared ray emitted by the third infrared light emitting diode.

Further, the control circuit determine the position of the external object in accordance with the distance between the first infrared light emitting diode and the external object, the distance between the second infrared light emitting diode and the external object and the distance between the third infrared light emitting diode and the external object, wherein R, n, s are nature numbers, and $0 \leq n$, $s \leq R$.

In addition, the control circuit collects a plurality of positions of the external object to determine a movement track of the external object, and then the control circuit determines a gesture in accordance with the movement track of the external object.

A position identification system is provided in the present invention. The position identification system includes a first infrared light emitting diode, a second infrared light emitting diode, an infrared receiver and a control circuit. The control circuit is coupled to the first infrared light emitting diode, the second infrared light emitting diode and the infrared receiver. During a first period, the control circuit controls the first infrared light emitting diode to emit a plurality of infrared rays with different intensities, wherein the first period is divided into P sub-periods, wherein the first infrared light emitting diode emits the infrared ray with $i^{th}$ intensity during the $i^{th}$ sub-period. When the infrared receiver detects a reflected infrared ray from an external object during the $j^{th}$ sub-period in the first period, the control circuit determines the distance between the first infrared light emitting diode and the external object in accordance with $j^{th}$ intensity of the infrared ray emitted by the first infrared light emitting diode.

During a second period, the control circuit controls the second infrared light emitting diode to emit a plurality of infrared rays with different intensities, wherein the second period is divided into Q sub-periods, wherein the second infrared light emitting diode emits the infrared ray with $k^{th}$ intensity during the $k^{th}$ sub-period. When the infrared receiver detects the reflected infrared ray from the external object during the $m^{th}$ sub-period in the second period, the control circuit determines the distance between the second infrared light emitting diode and the external object in accordance with $m^{th}$ intensity of the infrared ray emitted by the second infrared light emitting diode. Further, the control circuit determine the position of the external object in accordance with the distance between the first infrared light emitting diode and the external object and the distance between the second infrared light emitting diode and the external object, wherein i, j, k, m, P, Q are nature numbers, and $0 \leq i$, $j \leq P$, $0 \leq k$, $m \leq Q$.

A gesture identification system is provided in the present invention. The gesture identification system includes a first infrared light emitting diode, a second infrared light emitting diode, an infrared receiver and a control circuit. The control circuit is coupled to the first infrared light emitting diode, the second infrared light emitting diode and the infrared receiver. During a first period, the control circuit controls the first infrared light emitting diode to emit a plurality of infrared rays with different intensities, wherein the first period is divided into P sub-periods, wherein the first infrared light emitting diode emits the infrared ray with $i^{th}$ intensity during the $i^{th}$ sub-period. When the infrared receiver detects a reflected infrared ray from an external object during the $j^{th}$ sub-period in the first period, the control circuit determines the distance between the first infrared light emitting diode and the external object in accordance with $j^{th}$ intensity of the infrared ray emitted by the first infrared light emitting diode.

During a second period, the control circuit controls the second infrared light emitting diode to emit a plurality of infrared rays with different intensities, wherein the second period is divided into Q sub-periods, wherein the second infrared light emitting diode emits the infrared ray with $k^{th}$ intensity during the $k^{th}$ sub-period. When the infrared receiver detects the reflected infrared ray from the external object during the $m^{th}$ sub-period in the second period, the control circuit determines the distance between the second infrared light emitting diode and the external object in accordance with $m^{th}$ intensity of the infrared ray emitted by the second infrared light emitting diode. The control circuit determines the position of the external object in accordance with the distance between the first infrared light emitting diode and the external object and the distance between the second infrared light emitting diode and the external object. Further, the control circuit collects a plurality of distances between the first infrared light emitting diode and the external object and a plurality of distances between the second infrared, light emitting diode and the external object to determine a movement track of the external object, and then the control circuit determines a gesture in accordance with the movement track of the external object, wherein i, j, k, m, P, Q are nature numbers, and $0 \leq i$, $j \leq P$, $0 \leq k$, $m \leq Q$.

A position identification method is provided in the present invention. The position identification method includes the steps of: providing a first infrared light emitting diode; providing a second infrared light emitting diode; providing an infrared receiver; controlling the first infrared light emitting diode to emit a plurality of infrared rays with different intensities during a first period, wherein the first period is divided into P sub-periods, wherein the first infrared light emitting diode emits the infrared ray with $i^{th}$ intensity during the $i^{th}$ sub-period; determining the distance between the first infrared light emitting diode and the external object in accordance with $j^{th}$ intensity of the infrared ray emitted by the first infrared light emitting diode, when the infrared receiver detects a reflected infrared ray from an external object during the $j^{th}$ sub-period in the first period; controlling the second infrared light emitting diode to emit a plurality of infrared rays with different intensities during a second period, wherein the second period is divided into Q sub-periods, wherein the second infrared light emitting diode emits the infrared ray with $k^{th}$ intensity during the $k^{th}$ sub-period; determining the distance between the second infrared light emitting diode and the external object in accordance with $m^{th}$ intensity of the infrared ray emitted by the second infrared light emitting diode, when the infrared receiver detects the reflected infrared ray from the external object during the $m^{th}$ sub-period in the second period; determining the position of the external object in accordance with the distance between the first infrared light emitting diode and the external object and the distance between the second infrared light emitting diode and the external object, wherein i, j, k, m, P, Q are nature numbers, and 0≤i, j≤P, 0≤k, m≤Q.

A gesture identification method is provided in the present invention. The gesture identification method includes the steps of: providing a first infrared light emitting diode; providing a second infrared light emitting diode; providing an infrared receiver; controlling the first infrared light emitting diode to emit a plurality of infrared rays with different intensities during a first period, wherein the first period is divided into P sub-periods, wherein the first infrared light emitting diode emits the infrared ray $i^{th}$ with intensity during the $i^{th}$ sub-period; determining the distance between the first infrared light emitting diode and the external object in accordance with $j^{th}$ intensity of the infrared ray emitted by the first infrared light emitting diode, when the infrared receiver detects a reflected infrared ray from an external object during the $j^{th}$ sub-period in the first period; controlling the second infrared light emitting diode to emit a plurality of infrared rays with different intensities during a second period, wherein the second period is divided into Q sub-periods, wherein the second infrared light emitting diode emits the infrared ray with $k^{th}$ intensity during the $k^{th}$ sub-period; determining the distance between the second infrared light emitting diode and the external object in accordance with $m^{th}$ intensity of the infrared ray emitted by the second infrared light emitting diode, when the infrared receiver detects the reflected infrared ray from the external object during the $m^{th}$ sub-period in the second period; determining the position of the external object in accordance with the distance between the first infrared light emitting diode and the external object and the distance between the second infrared light emitting diode and the external object; collecting a plurality of positions of the external object to determine a movement track of the external object; and determining a gesture in accordance with the movement track of the external object, wherein i, j, k, m, P, Q are nature numbers, and 0≤i, j≤P, 0≤k, n≤Q.

In accordance with the exemplary embodiments of the present invention, the system further includes a third infrared light emitting diode, wherein the third infrared light emitting diode, the first infrared light emitting diode and the second infrared light emitting diode are disposed as a triangle. During a third period, the control circuit controls the third infrared light emitting diode to emit a plurality of infrared rays with different intensities, wherein the third period is divided into R sub-periods, wherein the third infrared light emitting diode emits the infrared ray with $n^{th}$ intensity during the $n^{th}$ sub-period.

When the infrared receiver detects the reflected infrared ray from the external object during the $s^{th}$ sub-period in the third period, the control circuit determines the distance between the third infrared light emitting diode and the external object in accordance with $s^{th}$ intensity of the infrared ray emitted by the third infrared light emitting diode. The control circuit determine the position of the external object in accordance with the distance between the first infrared light emitting diode and the external object, the distance between the second infrared light emitting diode and the external object and the distance between the third infrared light emitting diode and the external object, wherein R, n, s are nature numbers, and 0≤n, s≤R.

In the present invention, the digital image process in association with the digital image capture is not required. The present invention adopts infrared detection to detect the gesture. In order to accurately identify the motion path of the external object, at least two infrared light emitting diodes are needed. When one of the infrared light emitting diode performs IR emission, the other performs IR receiving. The present invention determines the distances between the external object and the light emitting diodes by emitting infrared with different intensities. Furthermore, in the present invention, time division multiplexing (TDM) is adopted such that the distance between the external object and the first infrared light emitting diode and the distance between the external object and the second infrared light emitting diode can be captured and the position of the external object can be estimated.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 25 illustrates a waveform diagram depicting an equivalent circuit for using infrared light emitting diode to detect IR according to the eleventh embodiment of the present invention.

DETAILED DESCRIPTION OF THE INVENTION

The present invention will be apparent from the following detailed description, which proceeds with reference to the accompanying drawings, wherein the same references relate to the same elements.

First Embodiment

Figure 1A:
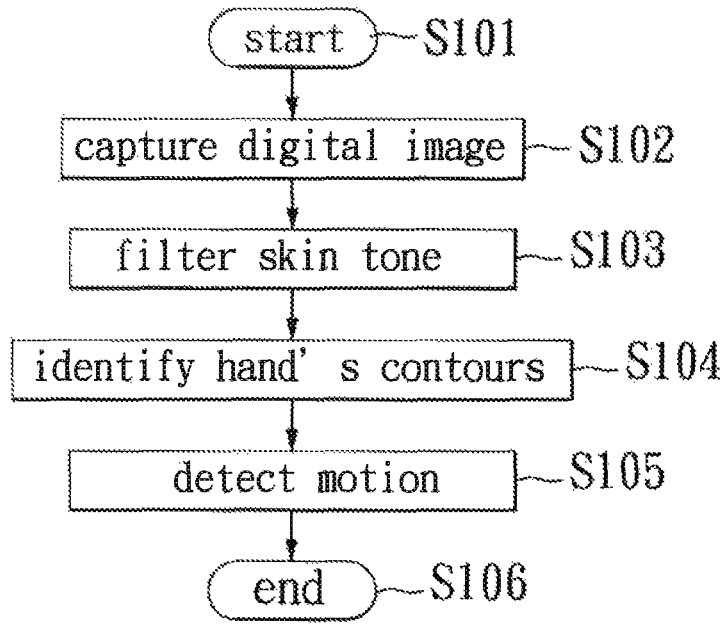
FIG. 1A illustrates the flow chart depicting the method for gesture identification in the conventional art.
Figure 1B:
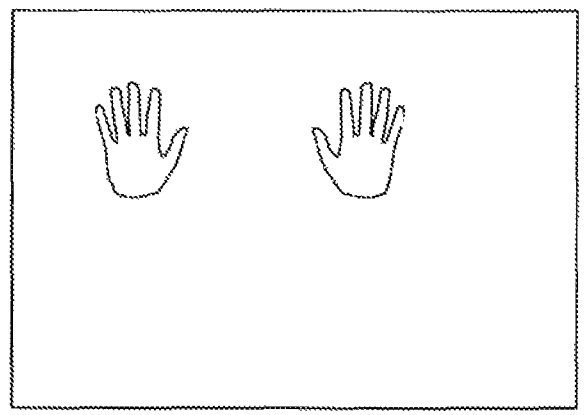
FIG. 1B illustrates the schematic of hand's contours capturing by image process of the conventional art.
Figure 2:
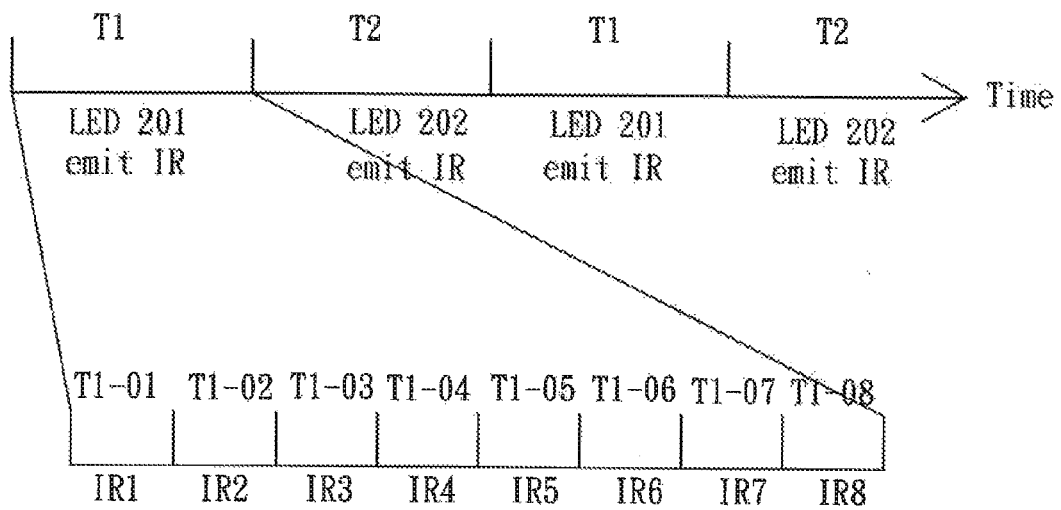
FIG. 2 illustrates a system block diagram depicting the position/gesture identification system according to the first embodiment of the present invention.
Figure 2:
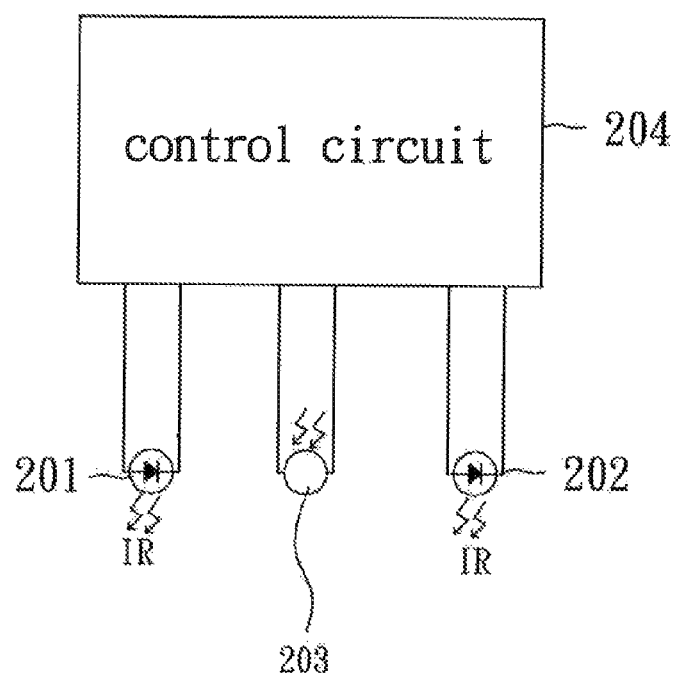

FIG. 2 illustrates a system block diagram depicting the position/gesture identification system according to the first embodiment of the present invention. Referring to FIG. 2, the position/gesture identification system includes a first infrared (IR) light emitting diode (LED) 201, a second IR LED 202, an IR receiver 203 and a control circuit 204. The control circuit 204 is used for controlling the IR receiver 203, the first IR LED 201 and the second IR LED 202. People having ordinary skill in the art can observe that in the circuit of the first embodiment, there is no digital capture device, such as digital camera, in the conventional art. In this embodiment, the pure IR technology is adopted for determining the position of an external object and further determining the movement track of the external object. In general, the IR receiver 203 is only can determine whether IR is received or not. The main application of the IR receiver 203 is the remote control of television.

First, it is assumed that the control period of the control circuit 204 is divided into a first period T1 and a second period T2. During the first period T1, the control circuit 204 controls the first IR LED 201 to emit IR. In addition, during the second period T2, the control circuit controls the second IR LED 202 to emit IR. Further, the IR receiver 203 can only determine whether IR is received or not, in order that the position gesture identification system can identify distance, the control circuit 204 controls the IR intensities of the first IR LED 201 and the second IR LED 202. For example, the first period T1 is divided into eight sub-periods T1-01~T1-08, also the second period T2 is divided into eight sub-period T2-01~T2-08. Moreover, the emitting intensity of IR of the first IR LED 201 is divided into eight intensities IR1~IR8, and the emitting intensity of IR of the second IR LED 202 is divided into eight intensities IR1~IR8, where IR1~IR8 respectively represent different intensity (strength) of IR.

During the first sub-period T1-01 of the first period T1, the control circuit 204 controls the first IR LED 201 emits IR with first intensity IR1, during the second sub-period T1-02 of the first period T1, the control circuit 204 controls the first IR LED 201 emits IR with second intensity IR2 . . . and so on. During the first sub-period T2-01 of the second period T1, the control circuit 204 controls the second IR LED 202 emits IR with first intensity IR1, during the second sub-period T2-02 of the second period T2, the control circuit 204 controls the second IR LED 202 emits IR with second intensity IR2 . . . and so on. In this embodiment, the intensity $IR1<IR2<IR3<IR4<IR5<IR6<IR7<IR8$.

According to the abovementioned example, assuming the external object is very close to the first IR LED 201, such as 5 cm, during the first sub-period T1-01 of the first period T1, the IR receiver 203 would receive the reflected IR from the external object. In addition, when the IR receiver 203 does not receive the reflected IR during the first sub-period T1-01~the third sub-period T1-03 of the first period T1, and the IR receiver 203 receives the reflected IR during the fourth sub-period T1-04 of the first period T1, because the IR intensity of the first IR LED 201 during the fourth sub-period T1-04 of the first period T1 is IR4, the control circuit 204 determines that the distance between the external object and the first IR LED 201 is a middle-distance, such as 20 cm. When the IR receiver 203 does not receive the reflected IR during the first sub-period T1-01~the seventh sub-period T1-07 of the first period T1, and the IR receiver 203 receives the reflected IR during the eighth sub-period T1-08 of the first period T1, because the IR intensity of the first IR LED 201 during the eighth sub-period T1-08 of the first period T1 is IR8, which is the greatest intensity, the control circuit 204 determines that the distance between the external object and the first IR LED 201 is a long-distance, such as 40 cm.

Since the circuit's operation during the second period T2 is substantially the same as the circuit's operation during the first period T1, people having ordinary skill in the art can comprehend the operation during the second period T2 by the abovementioned description, such that the detail description thereof is omitted. Moreover, the IR emitting sequence is from IR1 to IR8 in series in the abovementioned embodiment, people having ordinary skill in the art should know the emitting sequence can be re-organized according to design. The designer can randomly organize the IR1~IR8. Thus, the present invention is not limited thereto.

Afterward, the control circuit 204 would repeatedly perform the operation during the first period T1 and the operation during the second period T2. Since the first period T1 and the second period T2 are quite short, and the movement of the external object during the first period T1 or during the second period T2 is quite small, the movement of the external object during the first period T1 or during the second period T2 can be seen as 0. In other word, the external object would be regarded as motionless object during the first period T1 and during the second period T2.

The control circuit 204 can determine the position of the external object according to the distance between the external object and the first IR LED 201 and the distance between the external object and the second IR LED 202. In addition, the control circuit 204 collects a plurality of distances between the external object and the first IR LED 201 and a plurality of distances between the external object and the second IR LED 202 and determines the movement track of the external object according to the plurality of distances between the external object and the first IR LED 201 and the plurality of distances between the external object and the second IR LED 202 such that the control circuit 204 can determine the gesture of the object. In order to let people having ordinary skill in the art comprehend the spirit of the present invention, several exemplary examples are provided as follow.

Figure 3:
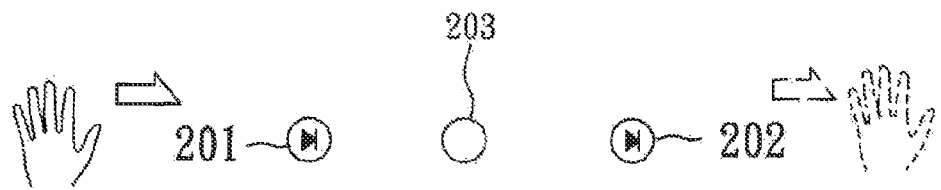
FIG. 3 illustrates a timing diagram (left to right) for determining position of the position/gesture identification system according to the first embodiment of the present invention.
Figure 3:
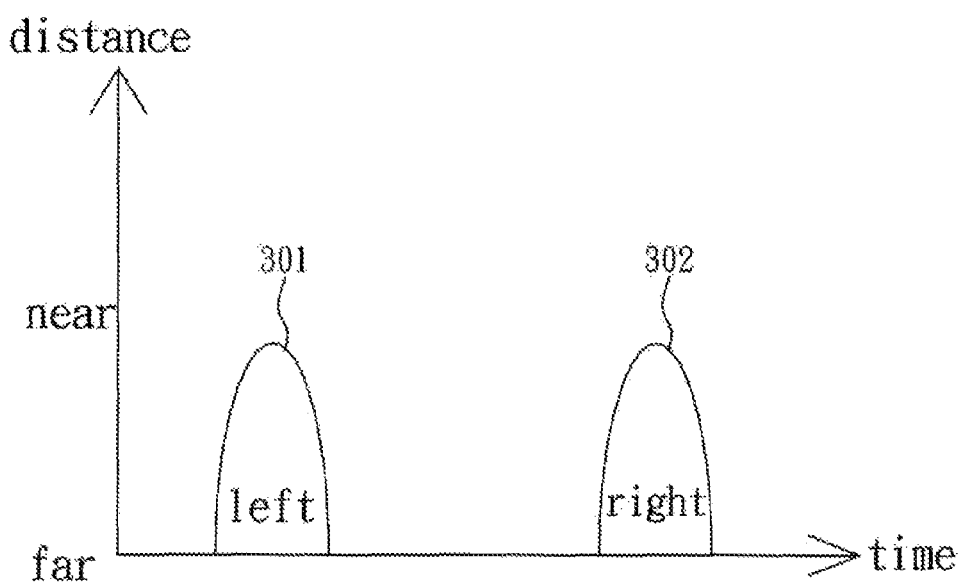

FIG. 3 illustrates a timing diagram (left to right) for determining position of the position/gesture identification system according to the first embodiment of the present invention. Referring to FIG. 3, in this example, a palm moves from the left side of the first IR LED 201 to the right side of the second IR LED 202. The vertical axis represents distance, the horizontal axis represents time. The label 301 represents the variation of the distance between the object and the first IR LED 201 with respect to time; the label 302 represents the variation of the distance between the object and the second IR LED 202 with respect to time. The lower the value in vertical axis is, the higher the intensity emitting by IR LED is used for detection. The higher the value in vertical axis is, the weaker the intensity emitted by IR LED is used. As shown in FIG. 3, the control circuit 204 can determine the time of movement of the external object and velocity of the external object, even the instantaneous velocity of the external object.

Figure 4:
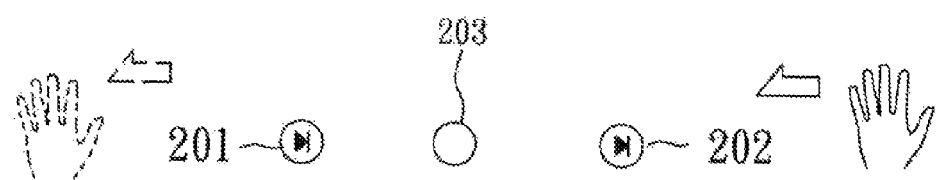
FIG. 4 illustrates a timing diagram (right to left) for determining position of the position/gesture identification system according to the first embodiment of the present invention.
Figure 4:
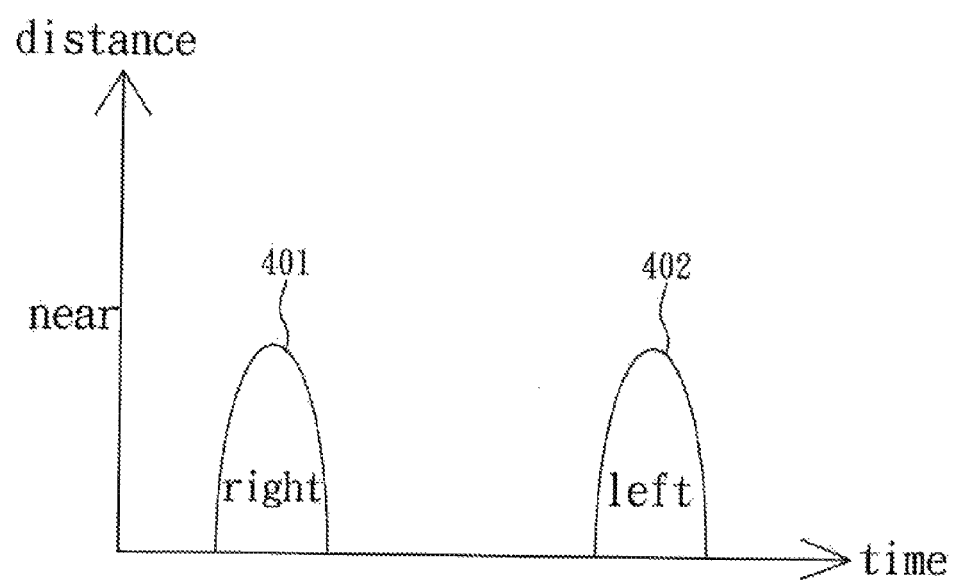

FIG. 4 illustrates a timing diagram (right to left) for determining position of the position/gesture identification system according to the first embodiment of the present invention. Referring to FIG. 4, similarly, in the present embodiment, the palm moves from the right side of the second IR LED 202 to the left side of the first IR LED 201. The label 401 represents the variation of the distance between the object and the second IR LED 202 with respect to time; the label 402 represents the variation of the distance between the object and the first IR LED 201 with respect to time. Since the detecting method is the same as before, the detail description is omitted.

Figure 5:
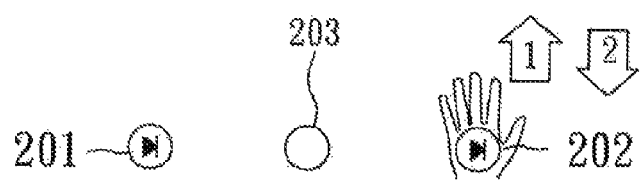
FIG. 5 illustrates a timing diagram (virtual tap) for determining position of the position/gesture identification system according to the first embodiment of the present invention.
Figure 5:
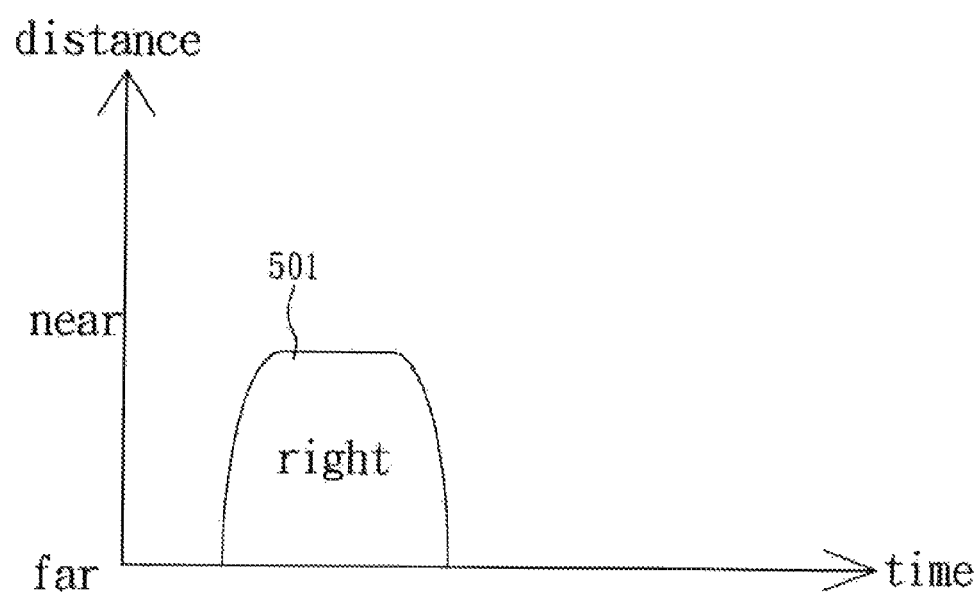

FIG. 5 illustrates a timing diagram (virtual tap) for determining position of the position/gesture identification system according to the first embodiment of the present invention. Referring to FIG. 5, in the present embodiment, the palm performs a virtual tap near the second IR LED 202. The action is that a user uses his/her hand to quick approach the second IR LED 202 to perform an action analog to pressing button. The label 501 is the variation of the distance between the object and the second IR LED 202 with respect to time for this action. The present embodiment can detect the continuous movement including approaching, halt, and leaving.

Figure 6:
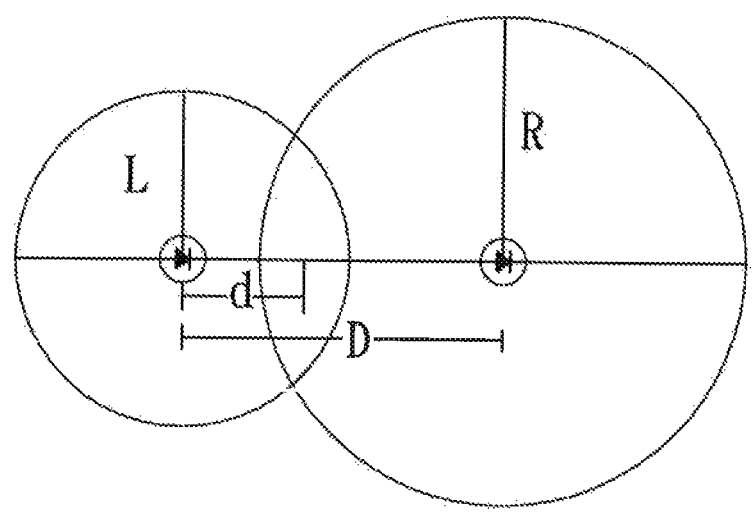
FIG. 6 illustrates a diagram for determining position of the position/gesture identification system according to the first embodiment of the present invention.

FIG. 6 illustrates a diagram for determining position of the position/gesture identification system according to the first embodiment of the present invention. Referring to FIG. 6, in this embodiment, in order to describe the position identification method for external object, it is assumed that the detected distance between the external object and the first IR LED 201 is "L", the detected distance between the external object and the second IR LED 202 is "R", the distance of horizontal projection between the first IR LED 201 and the external object is "d", and the distance between the first IR LED 201 and the second IR LED 202 is "D". The control circuit can calculate "d" as follow:

$$d=(L^2-R^2+D^2)/2D$$

As such, the position/gesture identification system can have the position information of the external object at anytime. However, in accordance with the abovementioned description, people having ordinary skill in the art should comprehend the function mentioned above is an estimating value, and the external object may not just at the position "d". The external object may locate in the intersection area covered by the intensity emitted by first IR LED 201 and the intensity emitted by the second IR LED 202. In addition, it is unnecessary to calculate "d" by the function, people having ordinary skill in the art can use another method to calculate "d", such as look-up table. Therefore, the present invention is not limited thereto.

In the abovementioned embodiment, eight IR intensities IR1~IR8 are provided as an example. In accordance with the abovementioned description, people having ordinary skill in the art can comprehend that the designer can design N sub-period and correspondingly design N intensities IR1~IRN, where N is nature number larger than 1. Thus, eight sub-period is not limited in the present invention.

Second Embodiment

Figure 7:
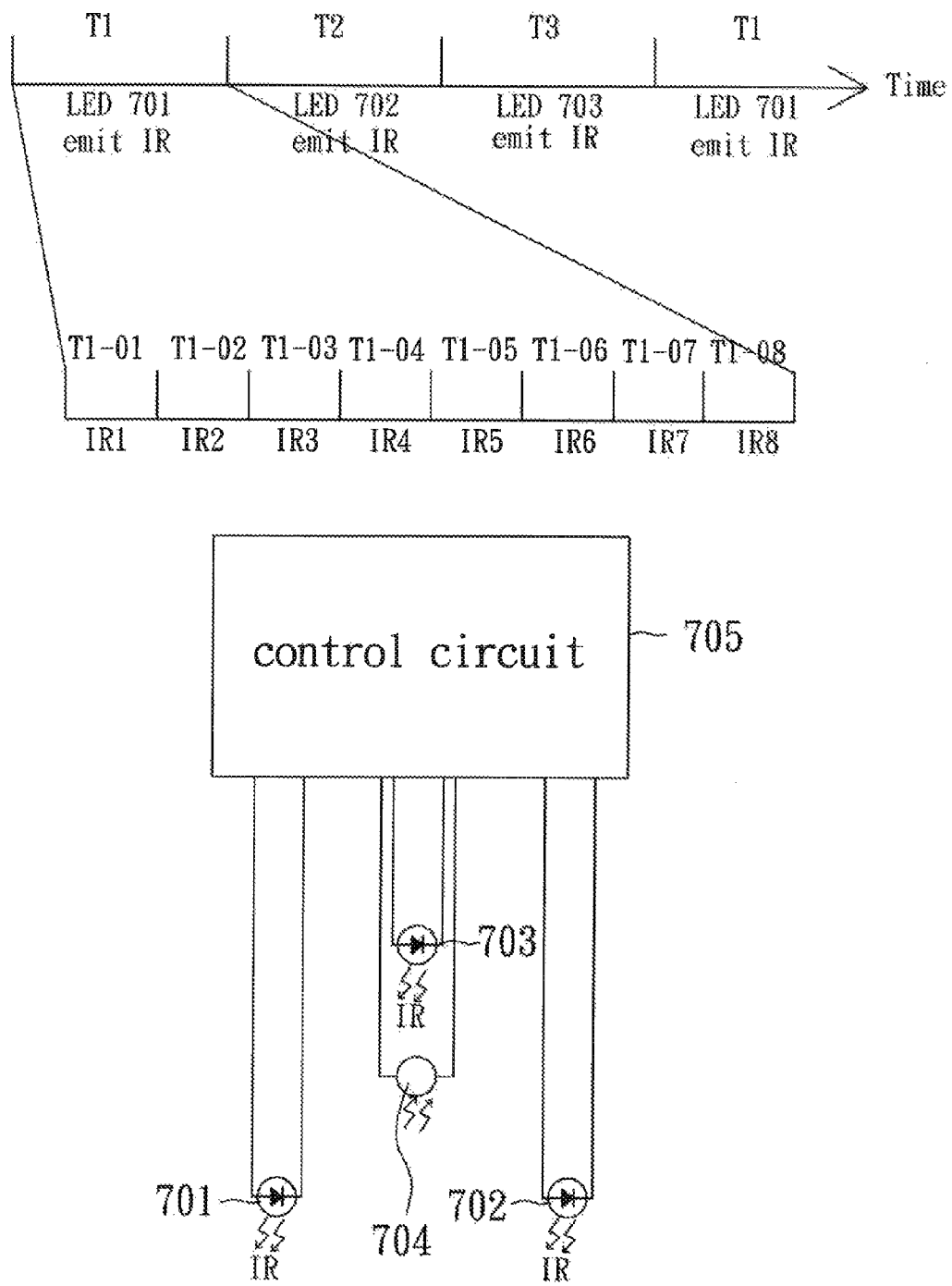
FIG. 7 illustrates a system block diagram depicting the position/gesture identification system according to the second embodiment of the present invention.

FIG. 7 illustrates a system block diagram depicting the position/gesture identification system according to the second embodiment of the present invention. Referring to FIG. 7, the position/gesture identification system includes a first IR LED 701, a second IR LED 702, a third IR LED 703, an infrared receiver 704 and a control circuit 705. The control circuit 705 is used for controlling the IR receiver 704, the first IR LED 701, the second IR LED 702, the third IR LED 703. Similarly, in the second embodiment, the image capture device is not required. In this embodiment, a third IR LED 703 is added in the position/gesture identification system. Thus, the system not only can detect the horizontal position, but vertical position.

Since a third IR LED 703 is added in the present embodiment, the control circuit 705 of the present embodiment has a little bit different from the control circuit 204 of the first embodiment. In the second embodiment, the control method of the control circuit 705 is divided into three phases and the control circuit 705 periodically performs the function of three phases.

Phase 1: in the first period, the control circuit 705 controls the first IR LED 701 to emit IR signal with different intensities;

Phase 2: in the second period, the control circuit 705 controls the second IR LED 702 to emit IR signal with different intensities;

Phase 3: in the third period, the control circuit 705 controls the third IR LED 703 to emit IR signal with different intensities.

Similar to forgoing embodiment, each of the first period T1, the second period T2 and the third period T3 would be respectively divided into a plurality of sub-periods. In order to conveniently describe the present embodiment, eight sub-periods are used to serve as an example. People having ordinary skill in the art should know that the more the sub-periods are, the higher the resolution of distance is. Thus, the present invention is not limited thereto. Moreover, since the first period T1, the second period T2 and the third period T3 are short enough, the movement of the external object during the first period T1, the second period T2 and the third period T3 would be seen as 0, such that the external object would be served as motionless object respectively during the first period T1, the second period T2 and the third period T3. In addition, in each of the sub-periods of the first period T1, the second period T2 and the third period T3, the corresponding IR LED emits IR signal with different intensities. The sequence of the IR intensities can be arranged from weak to strong or from strong to weak or in random order or according to designer's arrangement. Since the method for detecting a position of an external object is already described in the first embodiment by emitting IR with different intensities, the detail description is omitted. Several gesture identification examples are provided as follow such that people having ordinary skill in the art would comprehend the spirit of the present invention.

Figure 8:
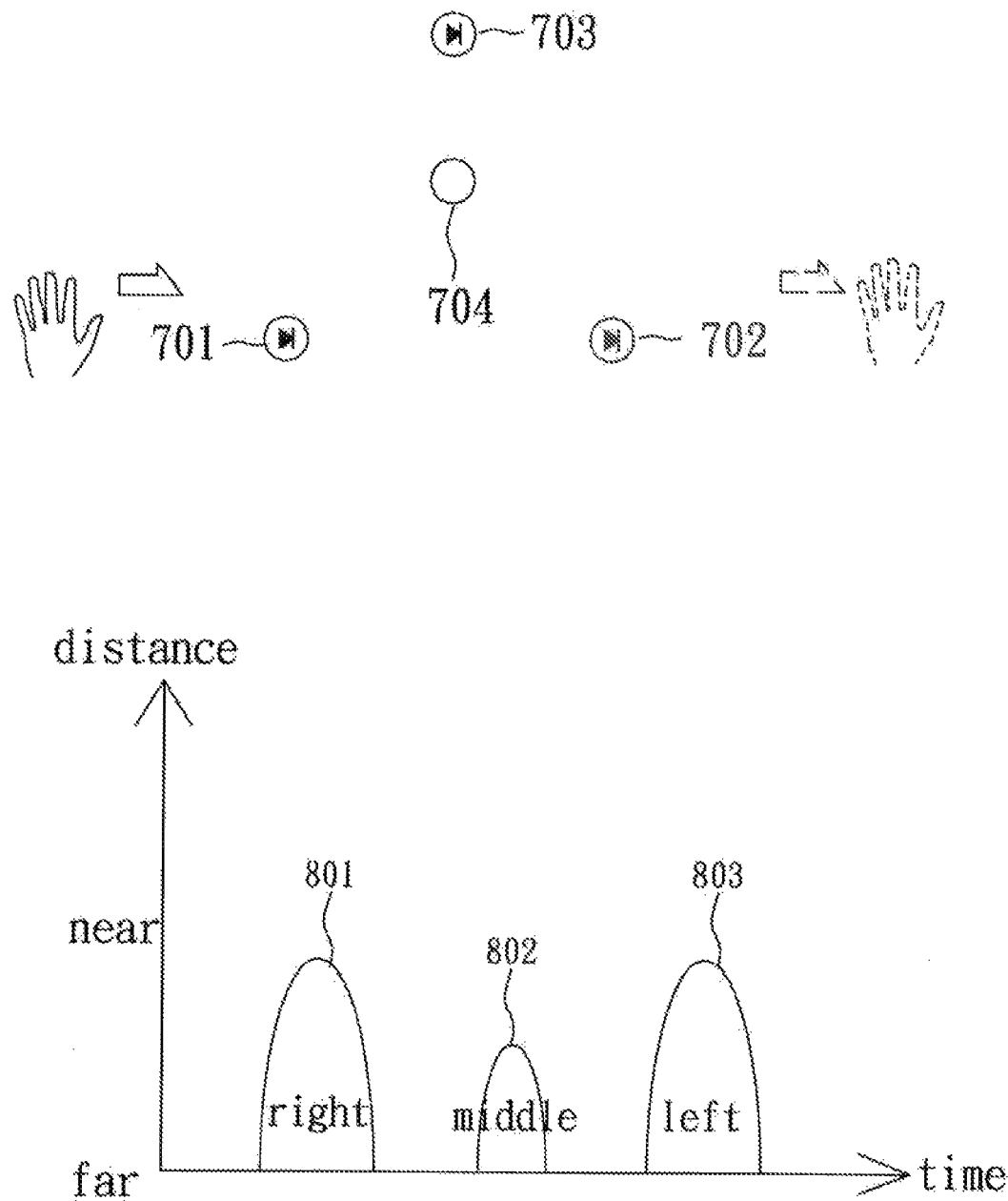
FIG. 8 illustrates a timing diagram (left to right) for determining position of the position/gesture identification system according to the second embodiment of the present invention.

FIG. 8 illustrates a timing diagram (left to right) for determining position of the position/gesture identification system according to the second embodiment of the present invention. Referring to FIG. 8, in the present embodiment, a palm moves from the left side of the first IR LED 701 to the middle side of the third IR LED 703 and then to the right side of the second IR LED 702. Similarly, the vertical axis represents distance, the horizontal axis represents time. The label 801 represents the variation of the distance between the first IR LED 701 and the external object in respect to time which the control circuit 705 detects. The label 802 represents the variation of the distance between the third IR LED 703 and the external object in respect to time which the control circuit 705 detects. The label 803 represents the variation of the distance between the second IR LED 702 and the external object in respect to time which the control circuit 705 detects. According to the waveforms 801, 802 and 803, since the third IR LED 703 in the middle is disposed at above of the first IR LED 701 and the second IR LED 702, the amplitude of the waveform 803 is smaller than the amplitude of the waveforms 801 and 802, and it shows the external object is farther from the third IR LED 703.

Figure 9:
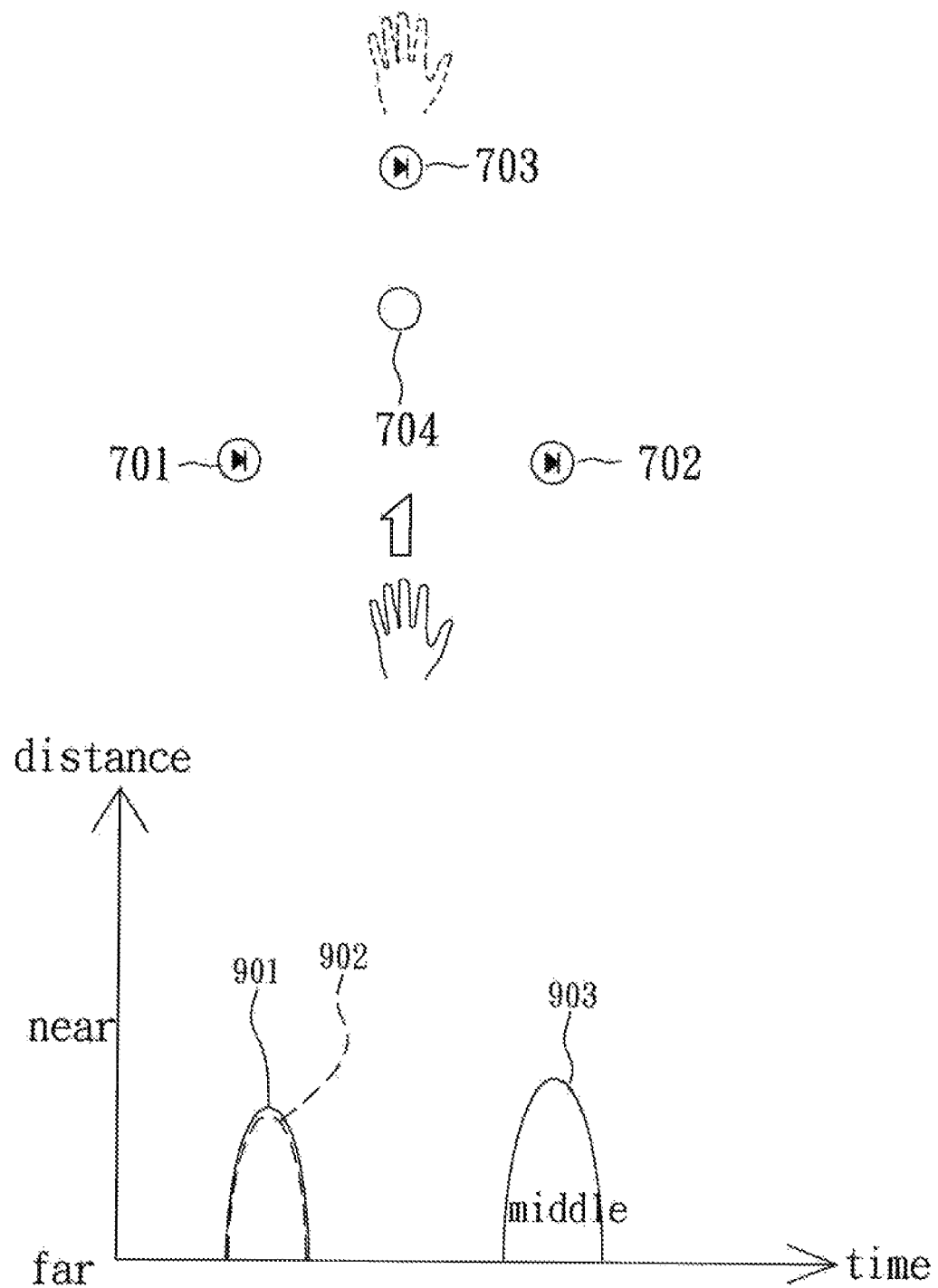
FIG. 9 illustrates a timing diagram (down to up) for determining position of the position/gesture identification system according to the second embodiment of the present invention.

FIG. 9 illustrates a timing diagram (down to up) for determining position of the position/gesture identification system according to the second embodiment of the present invention. Referring to FIG. 9, in this embodiment, the palm moves from the lower side of the first IR LED 701 and the second IR LED 702 to the upper side of the third IR LED 703. The label 901 represents the variation of the distance between the first IR LED 701 and the external object in respect to time which the control circuit 705 detects. The label 902 represents the variation of the distance between the second IR LED 702 and the external object in respect to time which the control circuit 705 detects. The label 903 represents the variation of the distance between the third IR LED 703 and the external object in respect to time which the control circuit 705 detects. According to the waveforms 901, 902 and 903, since the first IR LED 701 and the second IR LED 702 are respective disposed on the left side and right side, the amplitude of the waveforms 901 and 902 is smaller than the amplitude of the waveform 903, and it shows the external object is farther from the first IR LED 701 and the second IR LED 702.

Figure 10:
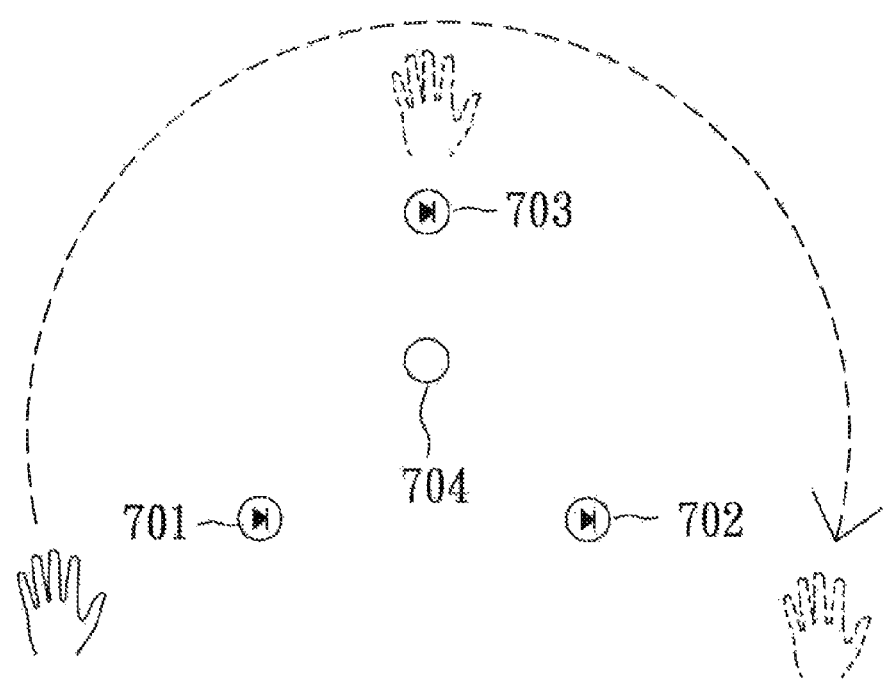
FIG. 10 illustrates a timing diagram (upper curve motion) for determining position of the position/gesture identification system according to the second embodiment of the present invention.
Figure 10:
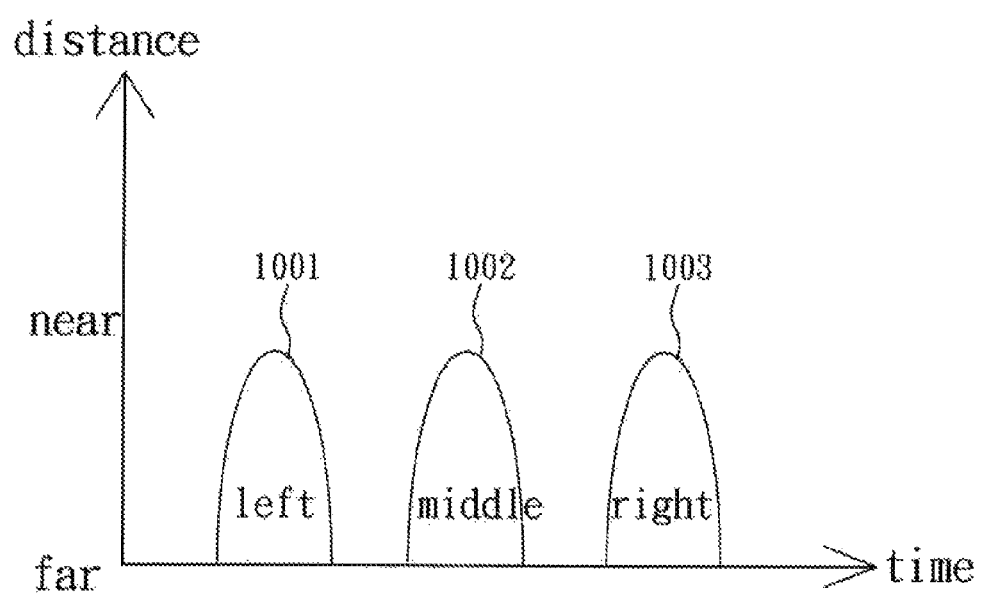

FIG. 10 illustrates a timing diagram (upper curve motion) for determining position of the position/gesture identification system according to the second embodiment of the present invention. Referring to FIG. 10, in this embodiment, the palm moves from the lower left of the first IR LED 701 to the upper side of the third IR LED 703 and then to the lower right of the second IR LED 702. The label 1001 represents the variation of the distance between the first IR LED 701 and the external object in respect to time which the control circuit 705 detects. The label 1002 represents the variation of the distance between the third IR LED 703 and the external object in respect to time which the control circuit 705 detects. The label 1003 represents the variation of the distance between the second IR LED 702 and the external object in respect to time which the control circuit 705 detects. According to the waveforms 1001, 1002 and 1003, since the movement track of the palm is an upper curve, the waveforms 1001, 1002 and 1003 are almost the same. Also, the sequence of the waveforms is 1001→1002→1003.

Figure 11:
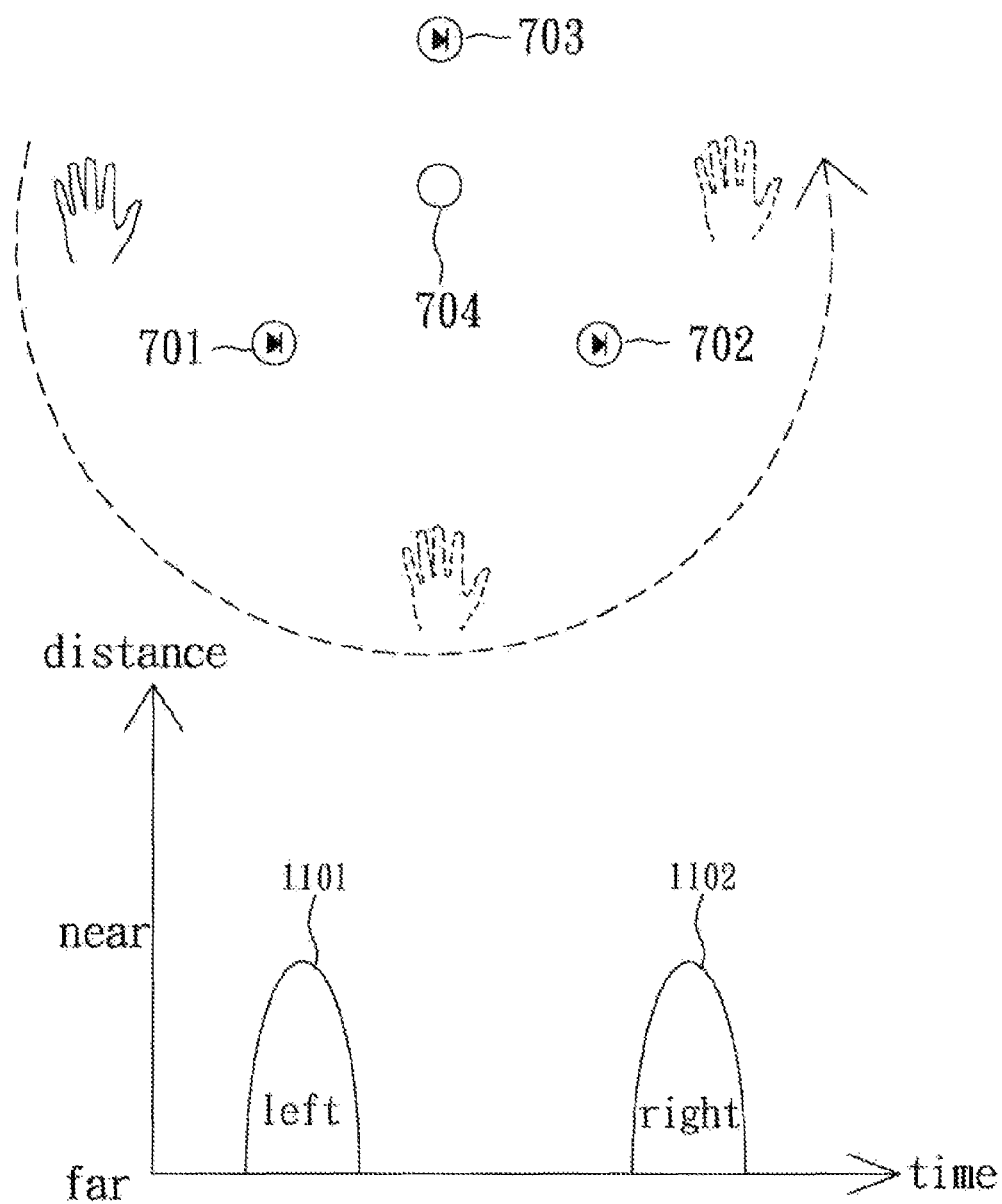
FIG. 11 illustrates a timing diagram (lower curve motion) for determining position of the position/gesture identification system according to the second embodiment of the present invention.

FIG. 11 illustrates a timing diagram (lower curve motion) for determining position of the position gesture identification system according to the second embodiment of the present invention. Referring to FIG. 11, in this embodiment, the palm moves from the upper left of the first IR LED 701 to the bottom of the third IR LED 703 and then to the upper right of the second IR LED 702. The label 1101 represents the variation of the distance between the first IR LED 701 and the external object in respect to time which the control circuit 705 detects. The label 1102 represents the variation of the distance between the second IR LED 702 and the external object in respect to time which the control circuit 705 detects. Since the gesture is a lower curve, the waveform 1101 is almost the same as the waveform 1102. However, the movement track does not pass the detection area of the third IR LED 703, the control circuit cannot detect the distance between the third IR LED 703 and the external object.

According to the second embodiment, it can be seen that the three IR LED plus the IR strength adjustment can achieve to identify the position of an external object with X-Y axis. Furthermore, the system may be used for identifying the position of an external object with X-Y-Z axis. Since the control circuit 705 can determine the distance between the object and each of IR LEDs 701, 702 and 703, the distance between the object and the system (depth) also can be determined, where X axis may represent the horizontal position, Y-axis may represent the vertical position, and Z-axis may represent the distance between the system and the external object (depth).

Moreover, the position identification method is substantially the same as that in the first embodiment. Since there are three IR LEDs in the present embodiment, determining two-dimensional position and three-dimensional position can be achieved.

Third Embodiment

Figure 12:
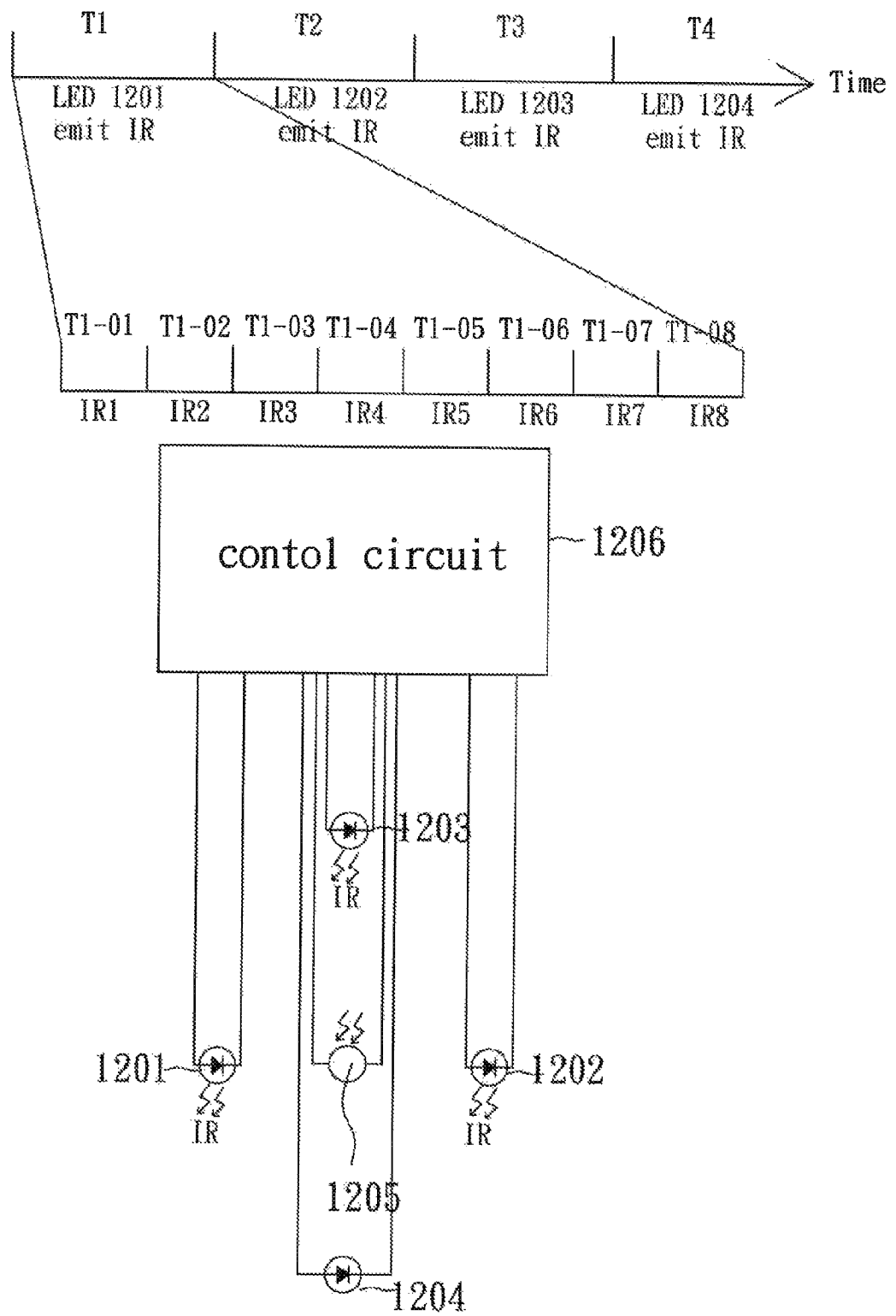
FIG. 12 illustrates a system block diagram depicting the position/gesture identification system according to the third embodiment of the present invention.

FIG. 12 illustrates a system block diagram depicting the position/gesture identification system according to the third embodiment of the present invention. Referring to FIG. 12, the position/gesture identification system includes a first IR LED 1201, a second IR LED 1202, a third IR LED 1203, a fourth IR LED 1204, an infrared receiver 1205 and a control circuit 1206. The control circuit is used for controlling the first IR LED 1201, the second IR LED 1202, the third IR LED 1203, the fourth IR LED 1204 and the infrared receiver 1205.

Similarly, in the third embodiment, the image capture device is also not required. comparing to the second embodiment, a fourth IR LED 1204 is added in the position/gesture identification system in this embodiment. Thus, the system can precisely detect the position and different gesture.

Since the fourth IR LED 1204 is added in this embodiment, the control method of the control circuit 1206 is slightly different from that of the control circuit 705 in the second embodiment. In this embodiment, the control method of the control circuit 1206 is divided into four phase and the control circuit 1206 periodically performs the function of four phases.

Phase 1: in the first period T1, the control circuit 1206 controls the first IR LED 1201 to emit IR signal with different intensities;

Phase 2: in the second period T2, the control circuit 1206 controls the second IR LED 1202 to emit IR signal with different intensities;

Phase 3: in the third period T3, the control circuit 1206 controls the third IR LED 1203 to emit IR signal with different intensities.

Phase 4: in the fourth period T4, the control circuit 1206 controls the fourth IR LED 1204 to emit IR signal with different intensities.

Similarly, each of the first period T1, the second period T2, the third period T3 and the fourth period T4 would be respectively divided a plurality of sub-period. In order to conveniently describe the present embodiment, eight sub-periods are used to serve as an example. People having ordinary skill in the art should know that the more the sub-periods are, the higher the resolution of distance is. Thus, the present invention is not limited thereto. Moreover, since the first period T1, the second period T2, the third period T3 and the fourth period T4 are short enough, the movement of the external object during the first period T1, the second period T2, the third period T3 and the fourth period would be seen as 0, such that the external object would be served as motionless object respectively during the first period T1, the second period T2, the third period T3 and the fourth period T4. In addition, in each of the sub-periods of the first period T1, the second period T2, the third period T3 and the fourth period T4, the corresponding IR LED emits IR signal with different intensities. The sequence of the IR intensities can be arranged from weak to strong or from strong to weak or in random order or according to designer's arrangement. Since the method for detecting a position of an external object is already described in the first embodiment by emitting IR with different intensities, the detail description is omitted. Several gesture identification examples are provided as follow such that people having ordinary skill in the art would comprehend the spirit of the present invention. Furthermore, in the present embodiment, the first IR LED 1201 is controlled for emitting IR in the first period T1; the second IR LED 1202 is controlled for emitting IR in the second period T2; the third IR LED 1203 is controlled for emitting IR in the third period T3; and the fourth IR LED 1204 is controlled for emitting IR in the fourth period T4, people having ordinary skill should know that the abovementioned sequence can be changed. For example, the second IR LED 1202 is controlled for emitting IR in the first period T1; the fourth IR LED 1204 is controlled for emitting IR in the second period T2; the third IR LED 1203 is controlled for emitting IR in the third period T3; and the first IR LED 1201 is controlled for emitting IR in the fourth period T4. Thus, the present invention is not limited thereto.

Since the method for detecting a position of an external object is already described in the first embodiment by emitting IR with different intensities, the detail description is omitted. Several gesture identification examples are provided as follow such that people having ordinary skill in the art would comprehend the spirit of the present invention.

Figure 13:
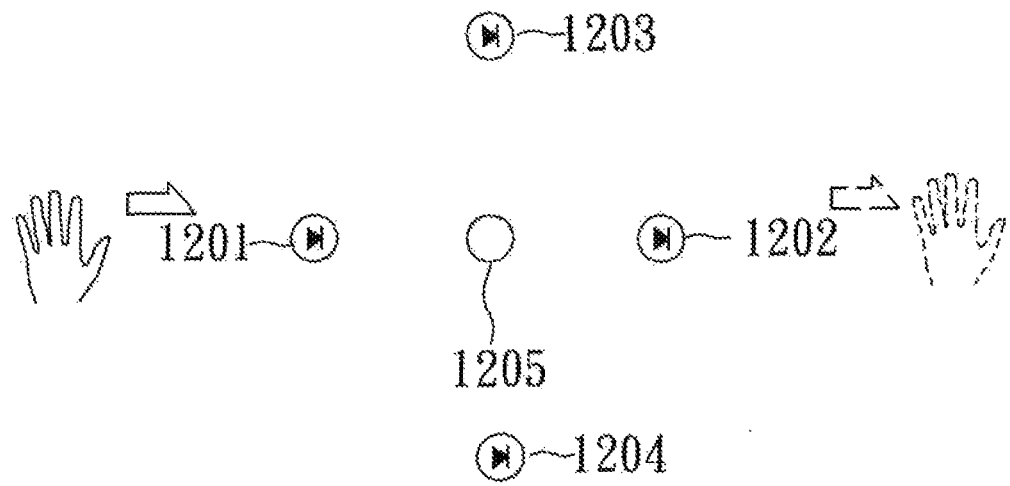
FIG. 13 illustrates a timing diagram (left to right) for determining position of the position/gesture identification system according to the third embodiment of the present invention.
Figure 13:
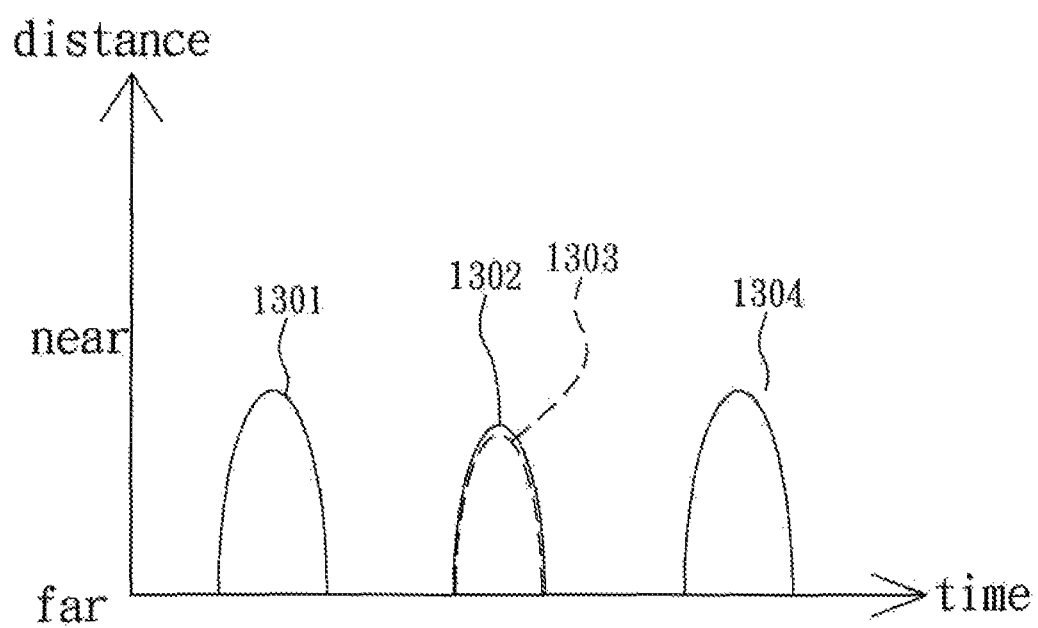

FIG. 13 illustrates a timing diagram (left to right) for determining position of the position/gesture identification system according to the third embodiment of the present invention. Referring to FIG. 13, in the present embodiment, the palm moves from the left side of the first IR LED 1201 to the middle between the third IR LED 1203 and fourth IR LED 1204, and then to the right side of the second IR LED 1202. Similarly, the vertical axis represents distance, the horizontal axis represents time. The label 1301 represents the variation of the distance between the first IR LED 1201 and the external object in respect to time which the control circuit 1206 detects. The label 1302 represents the variation of the distance between the third IR LED 1203 and the external object in respect to time which the control circuit 1206 detects. The label 1303 represents the variation of the distance between the fourth IR LED 1204 and the external object in respect to time which the control circuit 1206 detects. The label 1304 represents the variation of the distance between the second IR LED 1202 and the external object in respect to time which the control circuit 1206 detects. According to the waveforms 1301, 1302, 1303 and 1304, the third IR LED 1203 and the fourth IR LED 1204 are respectively disposed on the upper side and the lower side, the movement track is a direct line from the left to right, the amplitude of the waveforms 1302 and 1303 would show the movement path of the external object is farther from the third IR LED 1303 and the fourth IR LED 1304.

In addition, the situation which the palm moves from the right to the left is similar to the situation which the palm moves from the left to the right, people having ordinary skill in the art can comprehend the situation which the palm moves from the right to the left by the embodiment in FIG. 13. Thus, the detail description is omitted.

Figure 14:
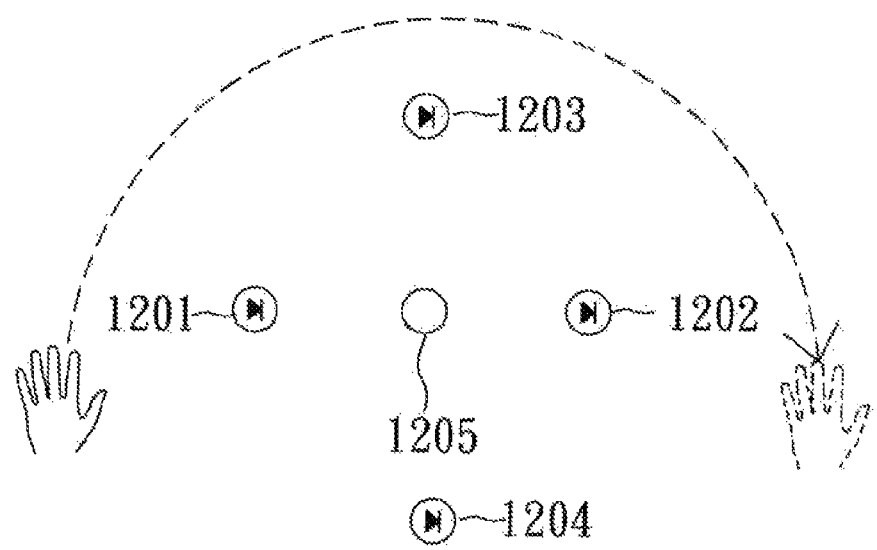
FIG. 14 illustrates a timing diagram (upper curve motion from lower left to lower right) for determining position of the position/gesture identification system according to the third embodiment of the present invention.
Figure 14:
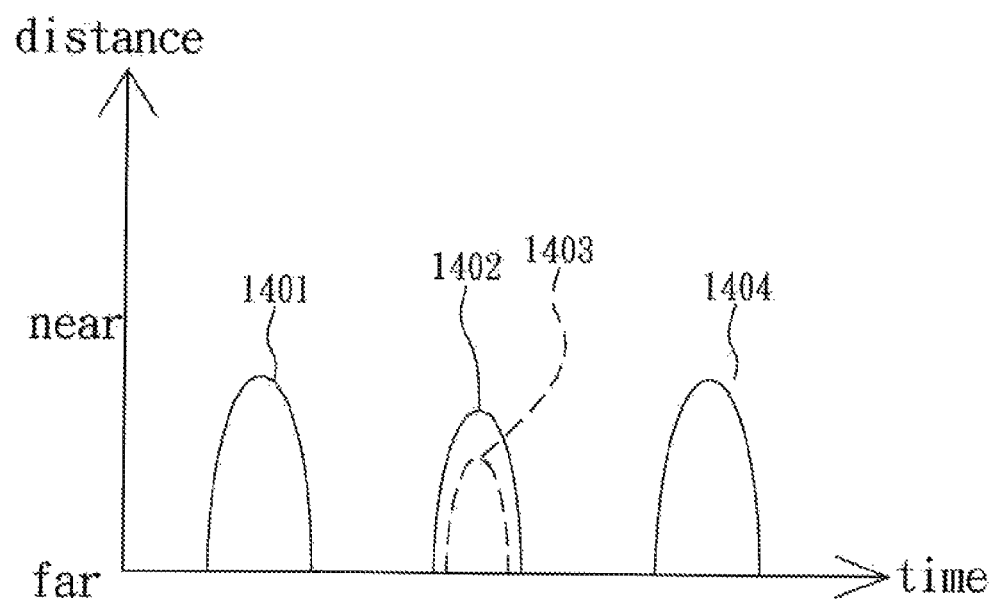

FIG. 14 illustrates a timing diagram (upper curve motion from lower left to lower right) for determining position of the position/gesture identification system according to the third embodiment of the present invention. Referring to FIG. 14, in this embodiment, the palm moves from the lower left side of the first IR LED 1201 to the upper side of the third IR LED 1203 and then to the lower right of the second IR LED 1202. The label 1401 represents the variation of the distance between the first IR LED 1201 and the external object in respect to time which the control circuit 1206 detects. The label 1402 represents the variation of the distance between the third IR LED 1203 and the external object in respect to time which the control circuit 1206 detects. The label 1403 represents the variation of the distance between the fourth IR LED 1204 and the external object in respect to time which the control circuit 1206 detects. The label 1404 represents the variation, of the distance between the second IR LED 1202 and the external object in respect to time which the control circuit 1206 detects. According to the waveforms 1401, 1402, 1403 and 1404, the first IR LED 1201 on the left side would first detect the variation of the distance in respect to time. Afterward, the third IR LED 1203 and the fourth IR LED 1204 would detect the variation of the distance respect o time at the same time. Finally, the second IR LED 1202 on the right side would detect the variation of the distance in respect to time. Since the movement track is a curve line, the distance between the fourth IR LED 1204 and the external object shown in the waveform 1403 is smaller than the distance between the third IR LED 1203 and the external object shown in the waveform 1402.

Similarly, the situation which the palm moves from the upper right to the upper left (lower curve) is similar to the situation which the palm moves from the lower left to the lower right (upper curve), people having ordinary skill in the art can comprehend the situation which the palm moves from the upper right to the upper left (lower curve) by the embodiment in FIG. 14. Thus, the detail description is omitted.

Figure 15:
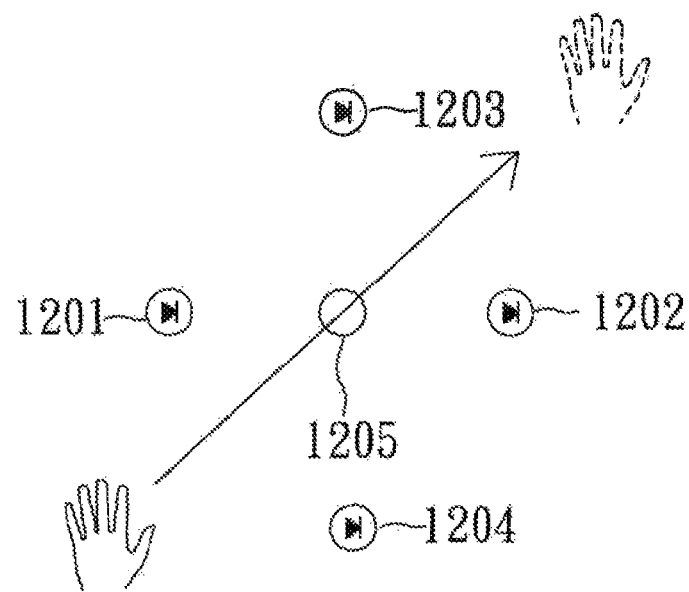
FIG. 15 illustrates a timing diagram (direct motion from lower left to upper right) for determining position of the position/gesture identification system according to the third embodiment of the present invention.
Figure 15:
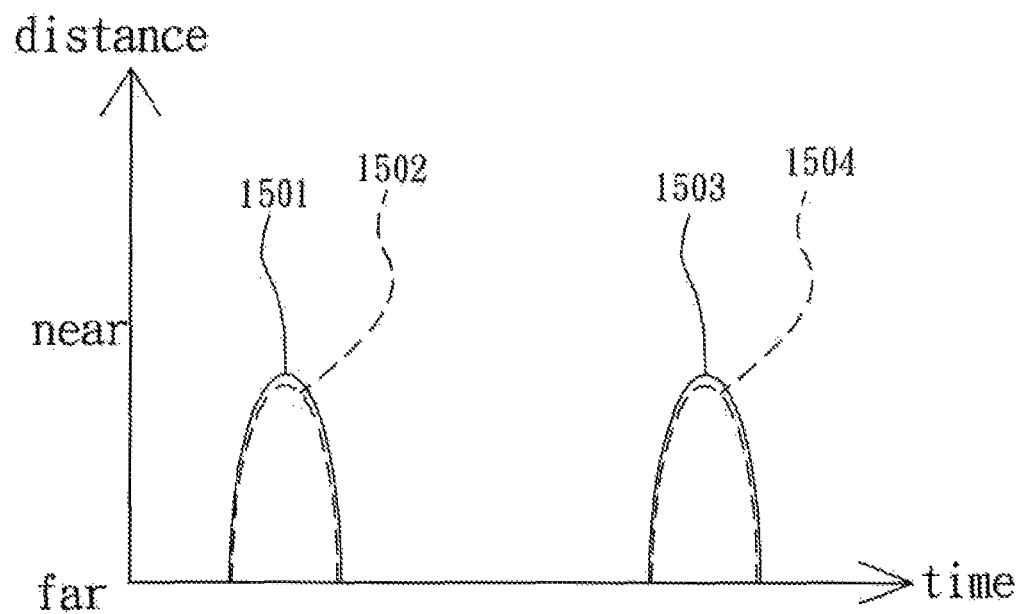

FIG. 15 illustrates a timing diagram (direct motion from lower left to upper right) for determining position of the position/gesture identification system according to the third embodiment of the present invention. Referring to FIG. 15, in this embodiment, the palm moves from the lower left of the first IR LED 1201 to the upper right of the second IR LED 1202 (oblique line). The label 1501 represents the variation of the distance between the first IR LED 1201 and the external object in respect to time which the control circuit 1206 detects. The label 1502 represents the variation of the distance between the fourth IR LED 1504 and the external object in respect to time which the control circuit 1206 detects. The label 1503 represents the variation of the distance between the third IR LED 1203 and the external object in respect to time which the control circuit 1206 detects. The label 1504 represents the variation of the distance between the second IR LED 1202 and the external object in respect to time which the control circuit 1206 detects. According to the waveforms 1501, 1502, 1503 and 1504, the first IR LED 1201 on the left side and the fourth IR LED 1204 on the lower side would first detect the variation of the distance in respect to time. Afterward, the second IR LED 1202 on the right side and the third IR LED 1203 on the upper side would detect the variation of the distance in respect to time. Since the movement track is an oblique line, the waveform 1501 representing the variation of the distance in respect to time of the first IR LED 1201 would be similar to the waveform 1502 representing the variation of the distance in respect to time of the fourth IR LED 1204 and the waveform 1504 representing the variation of the distance in respect to time of the second IR LED 1202 would be similar to the waveform 1503 representing the variation of the distance in respect to time of the third IR LED 1203.

Similar to forgoing reason, since the situation which the palm moves from the lower right to the upper left, the situation which the palm moves from the upper right to the lower left, and the situation which the palm moves from the upper left to the lower right are similar to the situation which the palm moves from the lower left to the upper right, people having ordinary skill in the art can comprehend those situations by the embodiment in FIG. 15. Thus, the detail description is omitted.

Figure 16A:
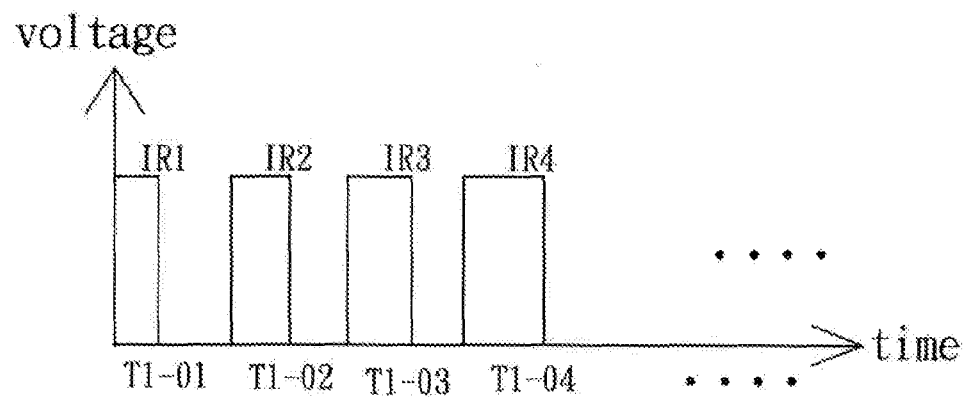
FIG. 16A illustrates a method for controlling the emitting intensity of the infrared light emitting diode using pulse width modulation (PWM) according to an embodiment of the present invention.

In addition, FIG. 16A illustrates a method for controlling the emitting intensity of the infrared light emitting diode using pulse width modulation (PWM) according to an embodiment of the present invention. Referring to FIG. 16A, in this embodiment, the PWM shown in FIG. 16A can be used to control the IR intensity of the abovementioned first, second, third, and fourth IR LEDs. The control circuit may send the pulse to the IR LEDs with different pulse width during different sub periods, the IR intensities of the first, second, third, and fourth IR LEDs can be correspondingly adjusted.

Figure 16B:
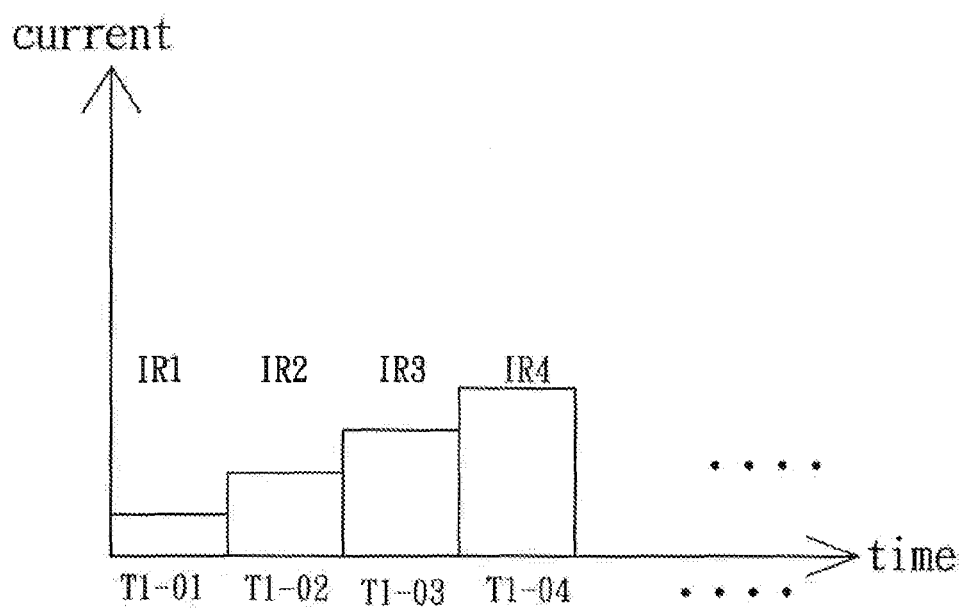
FIG. 16B illustrates a method for controlling the emitting intensity of the infrared light emitting diode using current according to an embodiment of the present invention.

FIG. 16B illustrates a method for controlling the emitting intensity of the infrared light emitting diode using current according to an embodiment of the present invention. Referring to FIG. 16B, similarly, the magnitude of the current can be used for adjusting the IR intensities of the abovementioned first, second, third and fourth IR LED.

Fourth Embodiment

Figure 17:
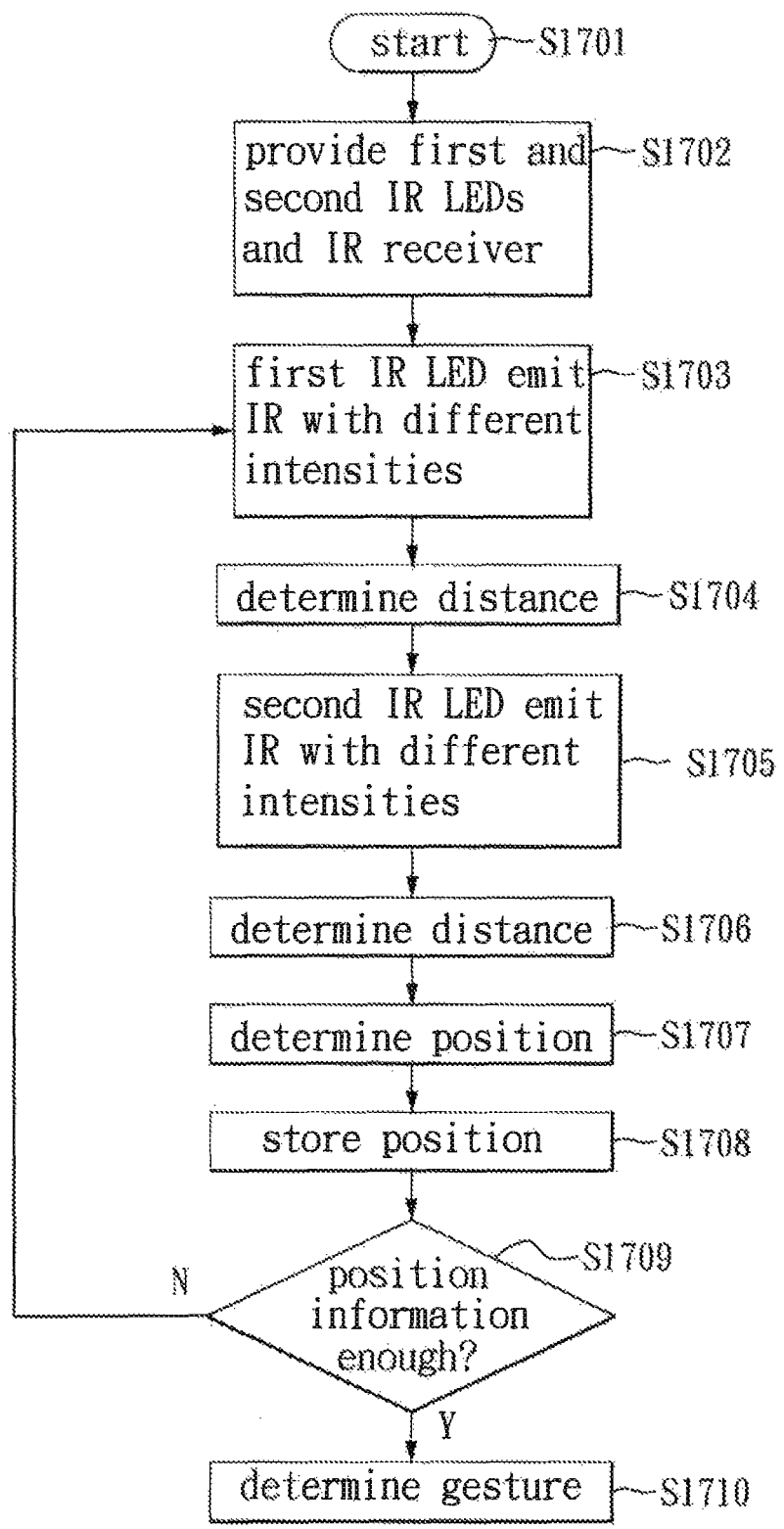
FIG. 17 illustrates a flow chart depicting the position identification method according to the fourth embodiment of the present invention.

In the abovementioned embodiments, the position gesture identification systems using IR detector and IR emitter are described. A position gesture identification method can be induced according to the first embodiment. FIG. 17 illustrates a flow chart depicting the position identification method according to the fourth embodiment of the present invention. Referring to FIG. 17, the method includes the steps of:

In step S1701, the method starts.

In step S1702, a first IR LED, a second IR LED and an infrared receiver is provided.

In step S1703, controlling the first IR LED to emit IR signal with different intensities. According to the first embodiment, the first period T1 is divided into eight sub-periods, where the first IR LED emits IR signal with different intensities during each sub-periods. For example, the first IR LED emits the IR signal with fourth intensity IR4 during the fourth sub-period T1-04 of the first period.

In step S1704, the distance is determined by receiving IR signal reflect by an external object. In each sub-period of the first period, the emitting IR intensities of the first IR LED are different, and the infrared receiver can only detect whether IR is received or not. Thus, the method for determining the distance between IR LED and external object may be to respectively arrange different digital numbers to each sub-period. For example, the digital number of IR1 is 128; the digital number of IR2 is 64; the digital number of IR3 is 32; the digital number of IR4 is 16; the digital number of IR5 is 8; the digital number of IR6 is 4; the digital number of IR7 is 2; the digital number of IR8 is 1. Assuming the reflected IR signal of an external object is received during T1-03 to T1-08, the control circuit can sum those digital numbers up to obtain 63. Afterward, a look-up table may be adopted, where the look-up table is as follow:

TABLE 1

| Digital number | Distance |
| --- | --- |
| (11111111) 255 | 5 cm |
| (01111111) 127 | 10 cm |
| (00111111) 63 | 15 cm |
| (00011111) 31 | 20 cm |
| (00001111) 15 | 25 cm |
| (00000111) 7 | 30 cm |
| (00000011) 3 | 35 cm |
| (00000001) 1 | 40 cm |

The control circuit would determine that the distance is 15 cm. In addition, the same digital number may be arranged for each sub-period or each intensity. For example, the digital number for IR1~IR8 is set to 1. Assuming the IR receiver receives the reflected IR signal of an external object during the sub-periods T1-05~T1-08, the control circuit can sum the numbers up to obtain 4. Also, the designer may design a look-up table as follow:

TABLE 2

| Digital number | Distance |
| --- | --- |
| 1 | 5 cm |
| 2 | 10 cm |
| 3 | 15 cm |
| 4 | 20 cm |
| 5 | 25 cm |
| 6 | 30 cm |
| 7 | 35 cm |
| 8 | 40 cm |

The control circuit can determine that the distance is 20 cm according to the abovementioned look-up table (Table 2).

In step S1705, controlling the second IR LED to emit IR signal with different intensities. According to the first embodiment, the second period T2 is also divided into eight sub-periods, wherein the second IR LED respectively emits the IR signal with different intensities during each sub-period. For example, the second IR LED emits the IR signal with the fifth intensity IR5 during the fifth sub-period.

In step S1706, the distance is determined by the reflected IR signal of an external object. Since this step is substantially the same as the step S1704, people having ordinary skill may refer to the description in step S1704 to obtain the corresponding implement method.

In step S1707, the position of the external object is determined according to the distance between the first IR LED and the external object and the distance between the second IR LED and the external object.

In step S1708, the position is stored.

In step S1709, it is determined whether the positions are enough or not. If they are insufficient, go to the step S1703 to collect the position. General speaking, to determine gesture, a plurality of positions are required. If the performing times are insufficient, the collected data does not complete enough, the movement track can not be determined. Meanwhile, the method would go back to the step S1703 to collect the position of the external object. To determine gesture, a movement track is necessary. Thus, in this embodiment, at least M positions and their corresponding time are required, in other words, the steps may at least perform M times, wherein M may be designed by designer. Furthermore, the designer may design to perform those steps to collect position information until the external object leaves the IR detecting area.

In step S1710, a gesture is determined according to the collected positions.

In the above mentioned embodiment, two kind of look-up tables are provided for determining distance, people having ordinary skill in the art should know that the look-up table may not be required. For example, the reflected IR signal is not received during the third sub-period T2-03 of the second period T2 when the second IR LED emits the IR signal with third intensity IR3, but the reflected IR signal is received during the fourth sub-period T2-04 of the second period T2 when the second IR LED emits the IR signal with fourth intensity IR4, the control circuit can certainly determine that the distance is 20 cm because the emitting intensity of the second IR LED during the fifth sub-period T2-05 of the second period T2 is IR5 which is stronger than IR4. The IR receiver would absolutely receive the reflected IR signal of the object. Thus, the distance can be determined when the IR receiver first receives the reflected IR signal.

Also, the example in the abovementioned paragraph is to emit the IR signal with IR1 during the first sub-period and to emit the IR signal with IR2 during the second sub-period . . . and so on. The IR intensity is gradually increased in the abovementioned example. When the implement method changes, such as to emit the IR signal with IR8 during the first sub-period and to emit the IR signal with IR7 during the second sub-period and so on, the distance determination method may also change. For example, the reflected IR signal is received during the third sub-period T2-03 of the second period T2 when the second IR LED emits the IR signal with sixth intensity IR6, but the reflected IR signal is not received during the fourth sub-period T2-04 of the second period T2 when the second IR LED emits the IR signal with fifth intensity IR5, the control circuit can certainly determine that the distance is 15 cm because the emitting intensity of the second IR LED during the sixth sub-period T2-06 of the second period T2 is IR4 which is weaker than IR5.

Fifth Embodiment

Figure 18:
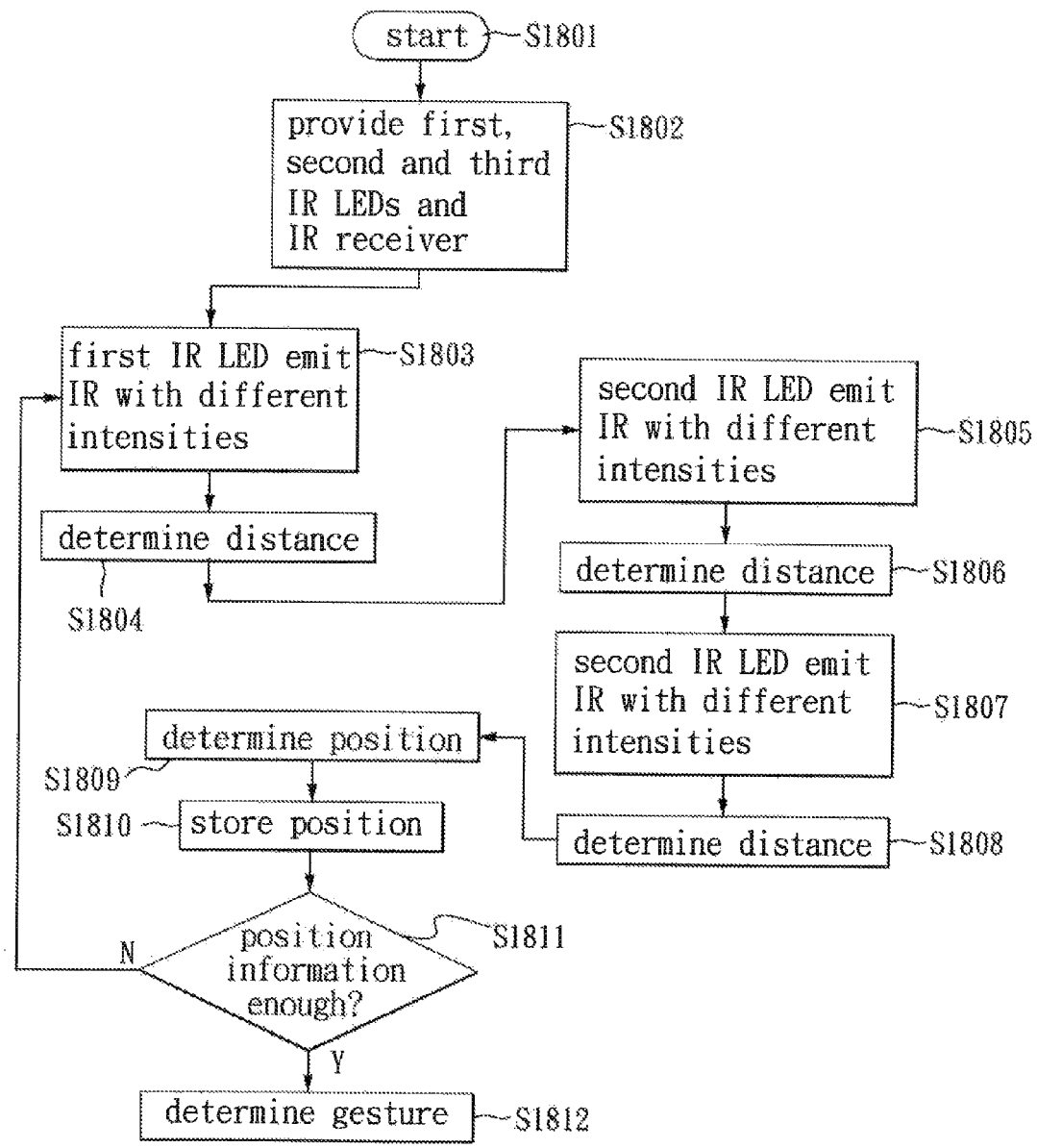
FIG. 18 illustrates a flow chart depicting the position identification method according to the fifth embodiment of the present invention.

Similarly, a position/gesture identification method can be induced according to the second embodiment. FIG. 18 illustrates a flow chart depicting the position identification method according to the fifth embodiment of the present invention. The method includes the steps of:

In step S1801, the method starts.

In step S1802, a first IR LED, a second IR LED, a third IR LED and an infrared receiver is provided.

In step S1803, controlling the first IR LED to emit an IR signal with different intensities during the first period T1. According to the second embodiment, the first period T1 is divided into eight sub-periods, wherein the first IR LED emits the IR signal with different intensities during corresponding sub-period. For example, the first IR LED emits the IR signal with fourth intensity IR4 during the fourth sub-period of the first period.

In step S1804, the distance is determined by receiving the reflected IR signal. Since the step S1804 is substantially the same as the step S1704, people having ordinary skill in the art may refer to the description in step S1704 to implement the step S1804.

In step S1805, controlling the second IR LED to emit an IR signal with different intensities during the second period T2. According to the second embodiment, the second period T2 is also divided into eight sub-periods, wherein the second IR LED emits the IR signal with different intensities during corresponding sub-period. For example, the second IR LED emits the IR signal with fifth intensity IR5 during the fifth sub-period of the second period.

In step S1806, the distance is determined by receiving the reflected IR signal. Since the step S1806 is substantially the same as the step S1704, people having ordinary skill in the art may refer to the description in step S1704 to implement the step S1806.

In step S1807, controlling the third IR LED to emit an IR signal with different intensities during the third period T3. According to the second embodiment, the third period T3 is also divided into eight sub-periods, wherein the third IR LED emits the IR signal with different intensities during corresponding sub-period. For example, the third IR LED emits the IR signal with fifth intensity IR5 during the fifth sub-period of the third period.

In step S1808, the distance is determined by receiving the reflected IR signal. Since the step S1808 is substantially the same as the step S1704, people having ordinary skill in the art may refer to the description in step S1704 to implement the step S1808.

In step S1809, the position is determined according to the distance between the first IR LED and the external object, the distance between the second IR LED and the external object and the distance between the third IR LED and the external object.

In step S1810, the position is stored.

In step S1811, it is determined whether the collected positions are enough or not. When the positions is insufficient, go back to the step S1803 to collect the position of the external object. Generally, to determine gesture, a plurality of positions is required. If the performing times are insufficient, the collected data does not complete enough, the movement track can not be determined. Meanwhile, the method would go back to the step S1803 to collect the position of the external object. To determine gesture, a movement track is necessary. Thus, in this embodiment, at least M positions and their corresponding time are required, in other words, the steps may at least perform M times, wherein M may be designed by designer. Furthermore, the designer may design to perform those steps to collect position information until the external object leaves the IR detecting area.

In step S1812, a gesture is determined according to the collected positions.

According to the fourth embodiment and the fifth embodiment, the difference between the method in the fourth embodiment and the method in the fifth embodiment is the third IR LED in the fifth embodiment and its corresponding third period T3. Since there are three IR LEDs in the fifth embodiment, the three periods T1~T3 are required.

Similarly, a position/gesture identification method can be also induced according to the third embodiment. The difference between the position/gesture identification method according to the third embodiment and the position/gesture identification method according to the second embodiment is the fourth IR LED and its corresponding fourth period T4. People having ordinary skill in the art can refer to the fourth embodiment and the fifth embodiment to implement the position/gesture identification method corresponding to the third embodiment. Thus, the detail description is omitted.

Sixth Embodiment

Figure 19:
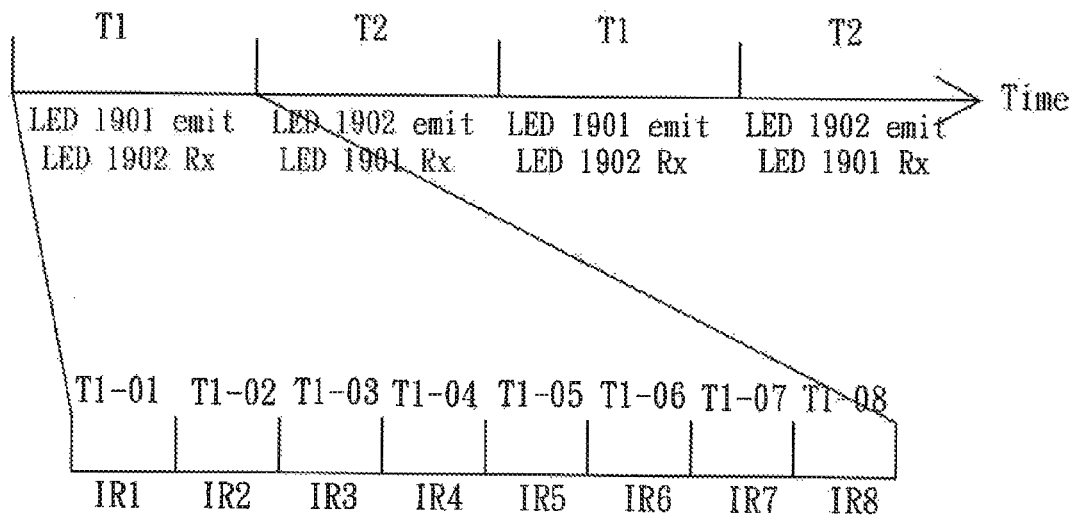
FIG. 19 illustrates a system block diagram depicting the position/gesture identification system according to the sixth embodiment of the present invention.
Figure 19:
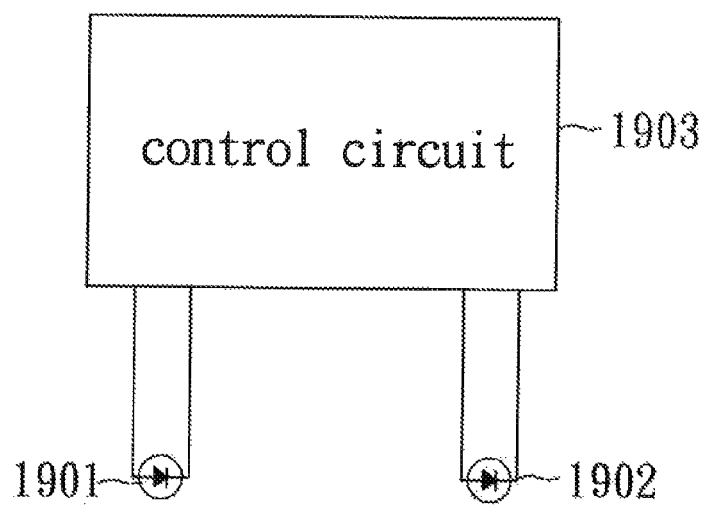

FIG. 19 illustrates a system block diagram depicting the position/gesture identification system according to the sixth embodiment of the present invention. Referring to FIG. 19, the position/gesture identification system includes a first IR LED 1901, a second IR LED 1902 and a control circuit 1903. The control circuit 1903 is used for controlling the first IR LED 1901 and the second IR LED 1902. People having ordinary skill in the art may notice that the difference between the sixth embodiment and the first embodiment is the IR receiver 203 in the first embodiment. In the sixth embodiment, the IR receiver 203 is omitted for simplifying the circuit of the system. The operation in this circuit is also slightly different from the operation in the circuit of the first embodiment.

First, assuming the control period of the control circuit 1903 includes a first period T1 and a second period T2. During the first period T1, the control circuit 1903 controls the first IR LED 1901 to emit an infrared signal and the control circuit 1903 controls the second IR LED 1902 to serve as an infrared receiver to receive the reflected IR signal. Moreover, during the second period T2, the control circuit 1903 controls the second IR LED 1902 to emit the IR signal and the control circuit 1903 controls the first IR LED to serve as the IR receiver to received the reflected IR signal.

Similarly, in order to identify the distance, the first IR LED 1901 and the second IR LED 1902 are controlled to emit the IR signal with different intensities. For example, the first period T1 is divided into eight sub-periods T1-01~T1-08, and the second period T2 is divided into eight sub-periods T2-01~T2-08. In addition, the emitted IR signal by the first IR LED 1901 has eight kind of intensities IR1~IR8, and the emitted IR signal by the second IR LED 1902 has eight kind of intensities IR1~IR8.

During the first sub-period T1-01 of the first period T1, the control circuit 1903 controls the first IR LED 1901 to emit the IR signal with first intensity IR1, and during the second sub-period T1-02 of the first period T1, the control circuit 1903 controls the first IR LED 1901 to emit the IR signal with second intensity IR2 and so on. During the first sub-period T2-01 of the second period T2, the control circuit 1903 controls the second IR LED 1902 to emit the IR signal with first intensity IR1, and during the second sub-period T2-02 of the second period T2, the control circuit 1903 controls the second IR LED 1902 to emit the IR signal with second intensity IR2 and so on. Assuming the first intensity IR1<the second intensity IR2<the third intensity IR3<the fourth intensity IR4<the fifth intensity IR5<the sixth intensity IR6<the seven intensity IR7<the eight intensity IR8.

According to the abovementioned example, assuming an external object is near to the first IR LED 1901, such as 5 cm, during the first sub-period T1-01 of the first period T1, the second IR LED 1902 would receive the reflected IR signal of the external object. For example, when the second IR LED 1902 does not receive the reflected IR signal during the first sub-period T1-01 to the third sub-period T1-03 of the first period T1 and the second IR LED 1902 receives the reflected IR signal during the fourth sub-period T1-04 of the first period T1, since the intensity of the IR signal emitted from the first IR LED 1901 is IR4, the control circuit 1903 determines that the distance between the first IR LED 1901 and the external object is a middle-distance, such as 20 cm. When the second IR LED 1902 does not receive the reflected IR signal during the first sub-period T1-01 to the seven sub-period T1-07 of the first period T1 and the second IR LED 1902 receives the reflected IR signal during the eighth sub-period T1-08 of the first period T1, since the intensity of the IR signal emitted from the first IR LED 1901 is IR8 (strongest), the control circuit 1903 determines that the distance between the first IR LED 1901 and the external object is a long-distance, such as 40 cm.

Since the circuit's operation during the second period T2 is substantially the same as the circuit's operation during the first period T1, people having ordinary skill in the art can comprehend the operation during the second period T2 by the abovementioned description, such that the detail description thereof is omitted. Moreover, the IR emitting sequence is from IR1 to IR8 in series in the abovementioned embodiment, people having ordinary skill in the art should know the emitting sequence can be re-organized according to design. The designer can randomly organize the IR1~IR8. Thus, the present invention is not limited thereto.

Next, the control circuit 1903 would repeatedly perform the operation in the first period T1 and the operation in the second period T2. Since the first period T1 and the second period T2 are quite short, and the movement of the external object during the first period T1 or during the second period T2 is quite small, the movement of the external object during the first period T1 or during the second period T2 can be seen as 0. In other word, the external object would be regarded as motionless object during the first period T1 and during the second period T2.

The control circuit 1903 can determine the position of the external object according to the distance between the external object and the first IR LED 1901 and the distance between the external object and the second IR LED 1902. In addition, the control circuit 1903 collects a plurality of distances between the external object and the first IR LED 1901 and a plurality of distances between the external object and the second IR LED 1902 and determines the movement track of the external object according to the plurality of distances between the external object and the first IR LED 1901 and the plurality of distances between the external object and the second IR LED 1902 such that the control circuit 1903 can determine the gesture of the object.

The difference between the sixth embodiment and the first embodiment is to replace the IR receiver with the second IR LED 1902 during the first period T1 and to replace the IR receiver with the first IR LED 1901 during the second period T2. Thus, people having ordinary skill in the art can refer to FIG. 3 to FIG. 6 and their corresponding descriptions to comprehend the position determination, the movement track determination and the gesture determination. The detail description thereof is omitted.

Seventh Embodiment

Figure 20:
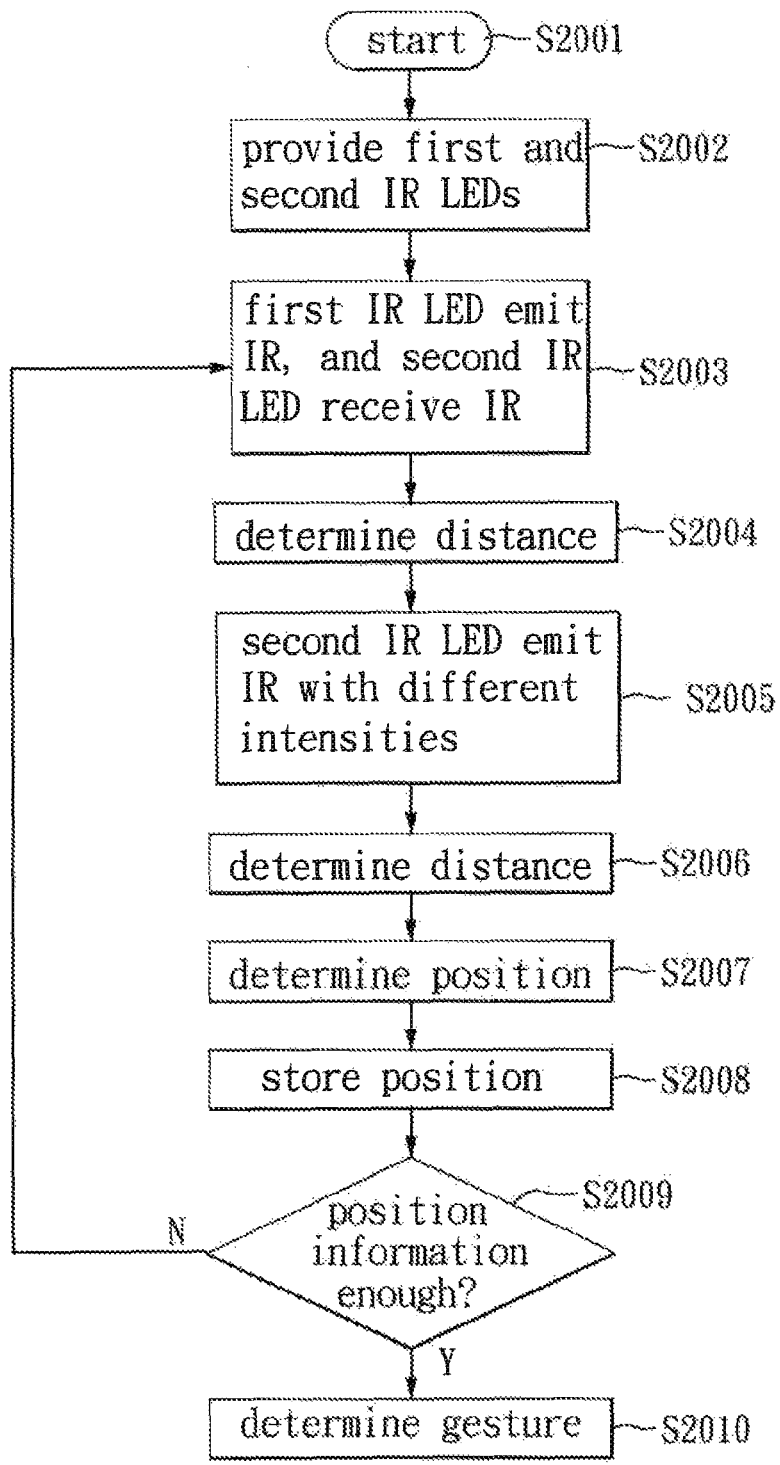
FIG. 20 illustrates a flow chart depicting the position identification method according to the seventh embodiment of the present invention.

Similarly, a position/gesture identification method can be induced according to the sixth embodiment. FIG. 20 illustrates a flow chart depicting the position identification method according to the seventh embodiment of the present invention. Referring to FIG. 20, the method includes the steps of:

In step S2001, the method starts.

In step S2002, the first IR LED and the second IR LED is provided.

In step S2003, during the first period T1, controlling the first IR LED to emit the IR signal with different intensities and controlling the second IR LED to serve as an IR receiver. According to the sixth embodiment, the first period T1 is divided into eight sub-period, wherein the first IR LED emits the IR signal with different intensities during each sub-periods. For example, the first IR LED emits the IR signal with fourth intensity during the fourth sub-period of the first period T1. In this embodiment, the second IR LED is adopted to replace the IR receiver during the first period T1. When the IR LED receives the IR signal, the voltage or/and the current would vary due to photoelectric effect, the characteristic of photoelectric effect is adopted in this embodiment to replace the IR receiver with the second IR LED to save the cost of the IR receiver.

In step S2004, the distance between the first IR LED and the external object is determined according to the reflected IR signal received by the second IR LED. The determination of the distance in this embodiment is substantially the same as that in the first embodiment and the fourth embodiment, people having ordinary skill in the art can implement the present embodiment according to the description in the first embodiment and the fourth embodiment. Thus the detail description is omitted.

In step S2005, during the second period T2, controlling the second IR LED to emit the IR signal with different intensities and controlling the first IR LED to serve as an IR receiver. Similarly, when the second IR LED emits the IR signal, the first IR LED is used for receiving IR signal.

In step S2006, the distance between the second IR LED and the external object is determined according to the reflected IR signal of the external object. The step S2006 is substantially the same as the step S2004. To determine distance, which uses IR LED to receive the reflected IR signal of the external object, is substantially the same as to determine distance, which uses the IR receiver to receive the reflected IR signal of the external object. People having ordinary skill in the art can comprehend the step according to the corresponding description in the fourth embodiment. Thus, the detail description is omitted.

In step S2007, the position of the external object is determined according to the distance between the first IR LED and the external object and the distance between the second IR LED and the external object.

In step S2008, the position is stored.

In step S2009, it is determined whether the stored positions are enough or not. If the stored positions are insufficient, go back to the step S2003 to collect the position. Generally, to determine gesture, a plurality of positions are required. If the performing times are insufficient, the collected data does not complete enough, the movement track can not be determined. Meanwhile, the method would go back to the step S2003 to collect the position of the external object. To determine gesture, a movement track is necessary. Thus, in this embodiment, at least M positions and their corresponding time are required, in other words, the steps may at least perform M times, wherein M may be designed by designer. Furthermore, the designer may design to perform those steps to collect position information until the external object leaves the IR detecting area.

In step S2010, a gesture is determined according to the plurality of position.

Eighth Embodiment

Figure 21:
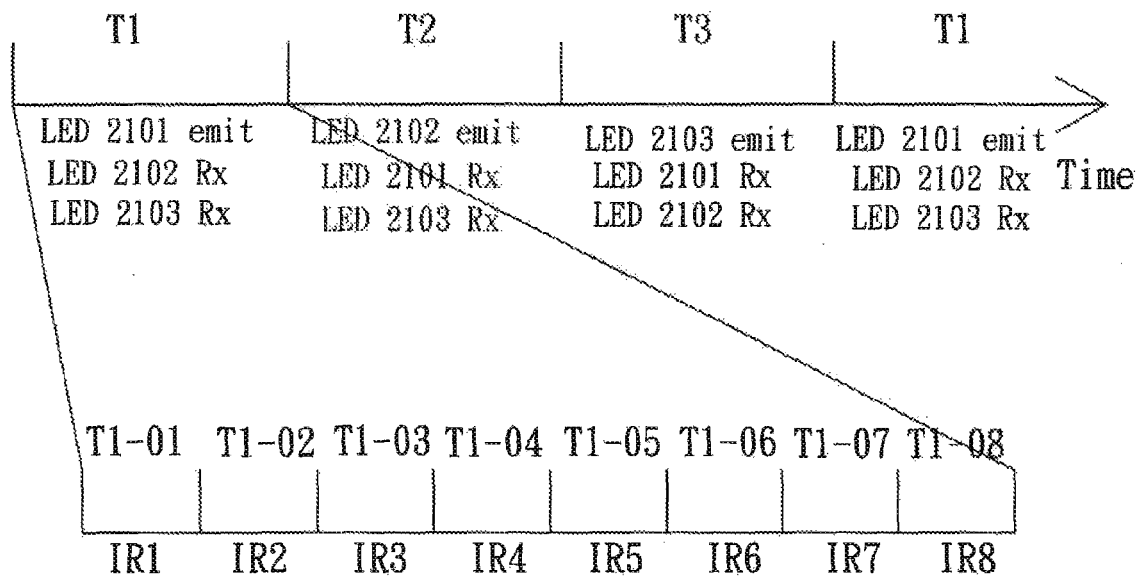
FIG. 21 illustrates a system block diagram depicting the position/gesture identification system according to the eighth embodiment of the present invention.
Figure 21:
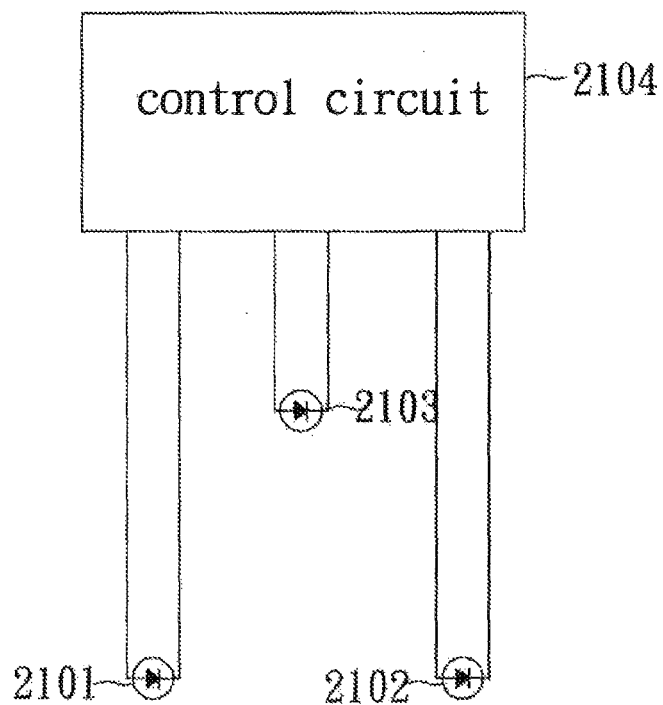

FIG. 21 illustrates a system block diagram depicting the position/gesture identification system according to the eighth embodiment of the present invention. Referring to FIG. 21, the position/gesture identification system includes a first IR LED 2101, a second IR LED 2102, a third IR LED 2103 and a control circuit 2104. The control circuit is used for controlling the first IR LED 2101, the second IR LED 2102 and the third IR LED 2103. Similarly, in this embodiment, the third IR LED 2103 is added in the system. In addition, comparing to the second embodiment, the system in the eighth embodiment removes the IR receiver. Since the third IR LED 2103 is added, the position from the left to the right can not only be determined, but the position from the bottom to the top can be determined.

Since the embodiment adds a third IR LED 2103, the operation of the control circuit 2104 is slightly different from the control circuit 1903 in the fifth embodiment. In this embodiment, the control method of the control circuit 2104 is divided into three phases and the control circuit 2104 periodically performs the function of three phases.

Phase 1: in the first period T1, the control circuit 2104 controls the first IR LED 2101 to emit IR signal with different sides;

Phase 2: in the second period T2, the control circuit 2104 controls the second IR LED 2102 to emit IR signal with different intensities;

Phase 3: in the third period T3, the control circuit 2104 controls the third IR LED 2103 to emit IR signal with different intensities.

Similarly, each of the first period T1, the second period T2 and the third period T3 would be respectively divided into a plurality of sub-periods. In order to conveniently describe the present embodiment, eight sub-periods are used to serve as an example. People having ordinary skill in the art should know that the more the sub-periods are, the higher the resolution of distance is. Thus, the present invention is not limited thereto. Moreover, since the first period T1, the second period T2 and the third period T3 are short enough, the movement of the external object during the first period T1, the second period T2 and the third period T3 would be seen as 0, such that the external object would be served as motionless object respectively during the first period T1, the second period T2 and the third period T3. In addition, in each of the sub-periods of the first period T1, the second period T2 and the third period T3, the corresponding IR LED emits IR signal with different intensities. The sequence of the IR intensities can be arranged from weak to strong or from strong to weak or in random order or according to designer's arrangement. Since the method for detecting a position of an external object is already described in the first embodiment by emitting IR with different intensities, the detail description is omitted.

Moreover, about the IR receiving, in each of the first period T1, the second period T2 and the third period T3, there are two IR LEDs to receive the reflected IR signal such that the distance can be detected by the control circuit 2104. When All of two IR LEDs receive the reflected IR signal, the control circuit 2104 would admittedly determine that this receiving process is an effective receiving process. When one of two IR LEDs receives the reflected IR signal, the designer can selectively design the control circuit 2104 to determine that this receiving process is an effective receiving process or an ineffective receiving process. If the designer designs that the receiving process is an effective receiving process when one of two IR LED receives the reflected IR signal, the position of the IR LED which receives the reflected IR signal can assist to determine the deviation of the position. For example, during the first period T1, only the second IR LED 2102 receives the reflected IR signal of the external object, the control circuit 2104 can determine that the position of the external object may be slightly lower. For example, during the first period T1, only the third IR LED 2103 receives the reflected IR signal, the control circuit 2104 may determine that the position of the external object is slightly upper-left.

Ninth Embodiment

Figure 22:
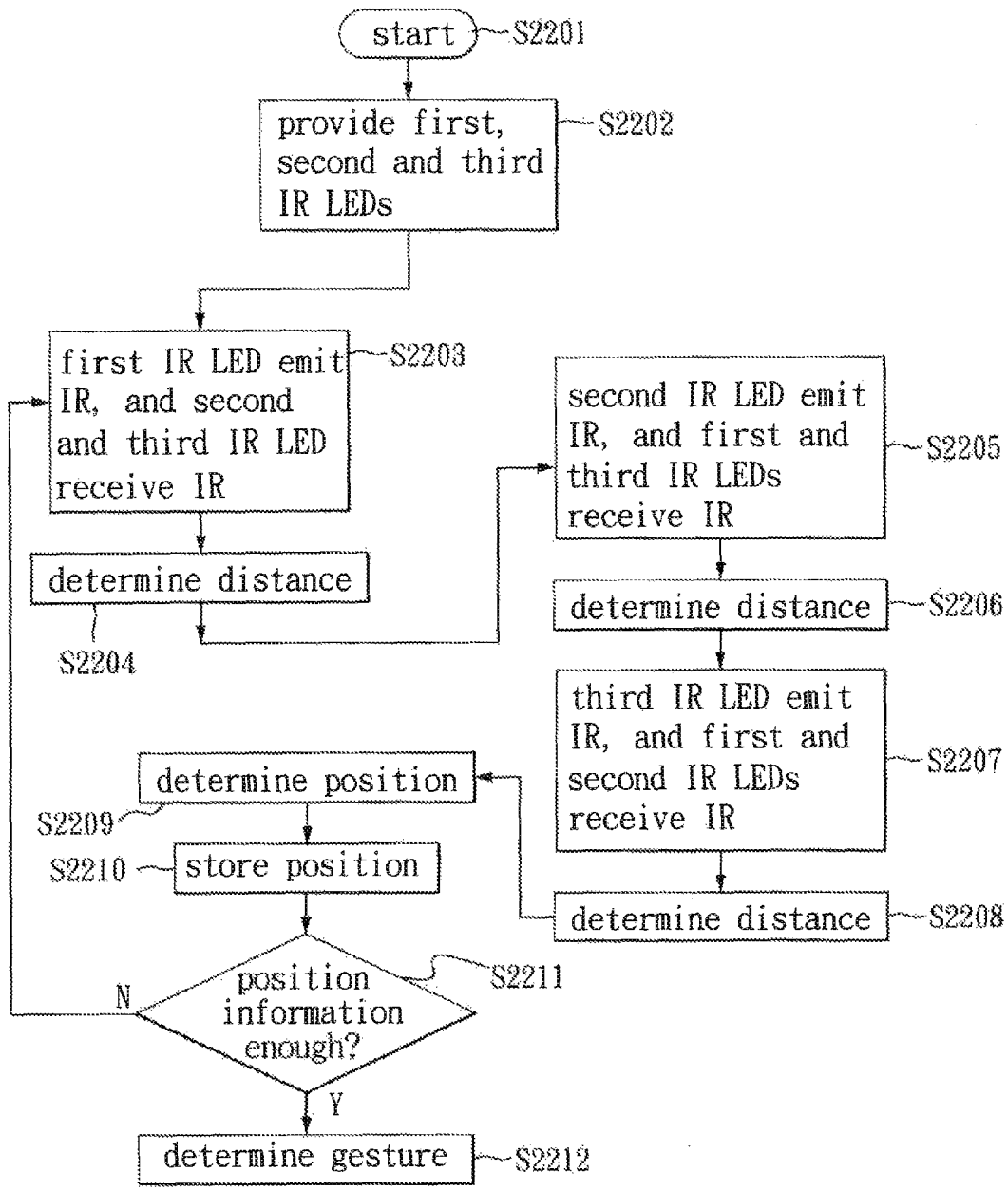
FIG. 22 illustrates a flow chart depicting the position identification method according to the ninth embodiment of the present invention.

Similarly, a position/gesture identification method can be induced according to the eighth embodiment. FIG. 22 illustrates a flow chart depicting the position identification method according to the ninth embodiment of the present invention. Referring to FIG. 22, the method includes the steps of:

In step S2201, the method starts.

In steps S2202, a first IR LED, a second IR LED and a third IR LED are provided.

In step S2203, during the first period T1, controlling the first IR LED to emit the IR signal with different intensities and controlling the second IR LED and the third IR LED to serve as the IR receivers.

In step S2204, it is determined the distance between the first IR LED and the external object by receiving the reflected IR signal through the second IR LED and the third IR LED. In this embodiment, the second IR LED and the third IR LED are used for receiving the IR signal during the first period T1, the designer can selectively design the effective receiving process is all of the second IR LED and the third IR LED receiving the reflected IR signal or one of the second IR LED and the third IR LED receiving the reflected IR signal. People having ordinary skill should know the position of the external object may be slightly lower if only the second IR. LED receives the reflected IR signal of the external object. Further, the position of the external object is slightly upper-left if only the third IR LED receives the reflected IR signal.

In step S2205, during the second period T2, controlling the second IR LED to emit the IR signal with different intensities, and control the first IR LED and the third IR LED to serve as the JR receivers.

In step S2206, it is determined the distance between the second IR LED and the external object by receiving the reflected IR signal through the first IR LED and the third IR LED. Similarly, in this embodiment, the first IR LED and the third IR LED are used for receiving the IR signal during the second period T2, the designer can selectively design the effective receiving process is all of the first IR LED and the third IR LED receiving the reflected IR signal or one of the first IR LED and the third IR LED receiving the reflected IR signal. People having ordinary skill should know the position of the external object may be slightly lower if only the first IR LED receives the reflected IR signal of the external object. Further, the position of the external object is slightly upper-right if only the third IR LED receives the reflected IR signal.

In step S2207, during the third period T3, controlling the third IR LED to emit the IR signal with different intensities, and control the first IR LED and the second IR LED to serve as the IR receivers.

In step S2208, it is determined the distance between the third IR LED and the external object by receiving the reflected IR signal through the first IR LED and the second IR LED. Similarly, in this embodiment, the first IR LED and the second IR LED are used for receiving the IR signal during the third period T3, the designer can selectively design the effective receiving process is all of the first IR LED and the second IR LED receiving the reflected IR signal or one of the first IR LED and the second IR LED receiving the reflected IR signal. People having ordinary skill should know the position of the external object may be slightly upper-left if only the first IR LED receives the reflected IR signal of the external object. Further, the position of the external object is slightly upper-right if only the second IR LED receives the reflected IR signal.

In step S2209, the position of the external object is determined according to the distance between the first IR LED and the external object, the distance between the second IR LED and the external object and the distance between the third IR LED and the external object.

In step S2210, the position is stored.

In step S2211, it is determined whether the stored positions are enough or not. If the stored positions are insufficient, go back to step S2203 to collect the position of the external object. Generally, to determine gesture, a plurality of positions are required. If the performing times are insufficient, the collected data does not complete enough, the movement track can not be determined. Meanwhile, the method would go back to the step S2203 to collect the position of the external object. To determine gesture, a movement track is necessary. Thus, in this embodiment, at least M positions and their corresponding time are required, in other words, the steps may at least perform M times, wherein M may be designed by designer. Furthermore, the designer may design to perform those steps to collect position information until the external object leaves the IR detecting area.

In step S2212, a gesture is determined according to the plurality of positions.

According to the seventh embodiment and the ninth embodiment, the different between the seventh embodiment and the ninth embodiment is the third IR LED and its corresponding T3. Since there are three IR LED, the three periods T1~T3 are necessary.

Tenth Embodiment

Figure 23:
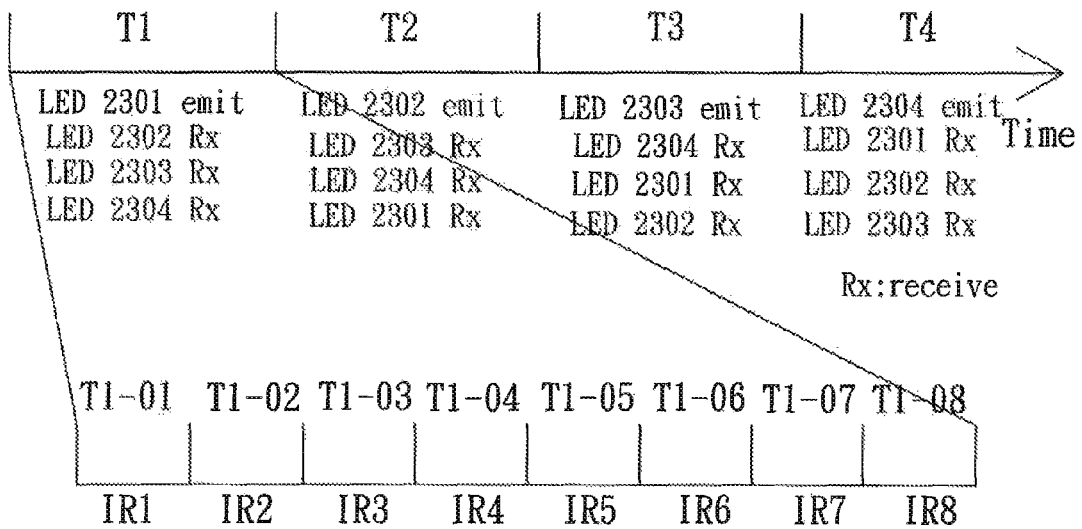
FIG. 23 illustrates a system block diagram depicting the position/gesture identification system according to the tenth embodiment of the present invention.
Figure 23:
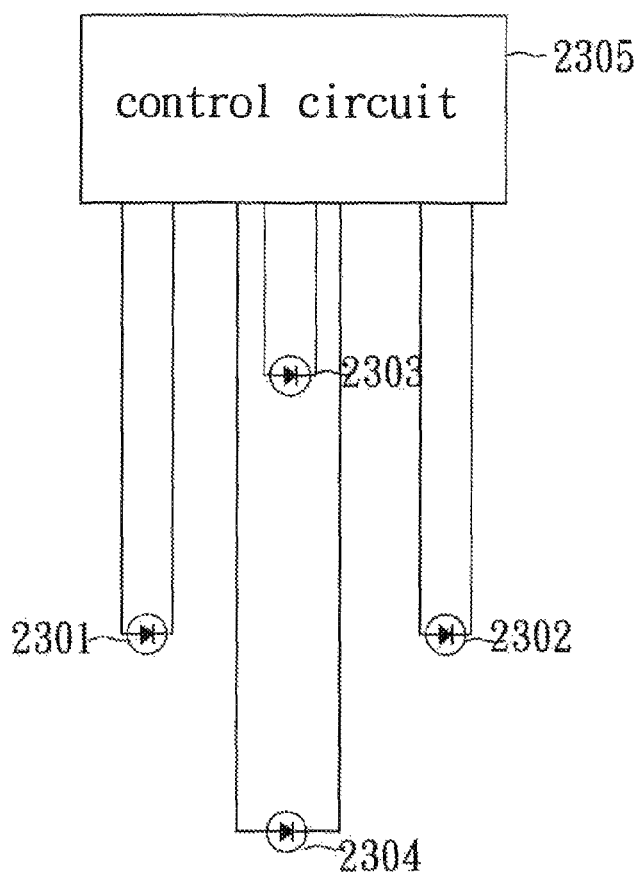

FIG. 23 illustrates a system block diagram depicting the position/gesture identification system according to the tenth embodiment of the present invention. Referring to FIG. 23, the position/gesture identification system includes a first IR LED 2301, a second IR LED 2302, a third IR LED 2303, a fourth IR LED 2304 and a control circuit 2305. The control circuit 2305 is used for controlling the first IR LED 2301, the second IR LED 2302, the third IR LED 2303 and the fourth IR LED 2304. Similarly, in the tenth embodiment, the image capture device is also not required. Comparing to the eighth embodiment, a fourth IR LED 2304 is added in the position/gesture identification system in this embodiment. Thus, the system can precisely detect the position and different gesture.

Since the fourth IR LED 2304 is added in this embodiment, the control method of the control circuit 2305 is slightly different from that of the control circuit 2104 in the eighth embodiment. In this embodiment, the control method of the control circuit 2305 is divided into four phase and the control circuit 2305 periodically performs the function of four phases.

Phase 1: in the first period T1, the control circuit 2305 controls the first IR LED 2301 to emit IR signal with different intensities, and the control circuit 2305 controls the second IR LED 2302, the third IR LED 2303 and the fourth IR LED 2304 to serve as the IR receivers;

Phase 2: in the second period T2, the control circuit 1206 controls the second IR LED 2302 to emit IR signal with different intensities, and the control circuit 2305 controls the first IR LED 2301, the third IR LED 2303 and the fourth IR LED 2304 to serve as the IR receivers;

Phase 3: in the third period 13, the control circuit 2305 controls the third IR LED 2303 to emit IR signal with different intensities, and the control circuit 2305 controls the first IR LED 2301, the second IR LED 2302 and the fourth IR LED 2304 to serve as the IR receivers;

Phase 4; in the fourth period T4, the control circuit 2305 controls the fourth IR LED 2304 to emit IR signal with different intensities, and the control circuit 2305 controls the first IR LED 2301, the second IR LED 2302 and the third IR LED 2303 to serve as the IR receivers.

Similarly, each of the first period T1, the second period T2, the third period T3 and the fourth period T4 would be respectively divided into a plurality of sub-periods. In order to conveniently describe the present embodiment, eight sub-periods are used to serve as an example. People having ordinary skill in the art should know that the more the sub-periods are, the higher the resolution of distance is. Thus, the present invention is not limited thereto. Moreover, since the first period T1, the second period T2, the third period T3 and the fourth period T4 are short enough, the movement of the external object during the first period T1, the second period T2, the third period T3 and the fourth period would be seen as 0, such that the external object would be served as motionless object respectively during the first period T1, the second period T2, the third period T3 and the fourth period 14. In addition, in each of the sub-periods of the first period T1, the second period T2, the third period T3 and the fourth period T4, the corresponding IR LED emits IR signal with different intensities. The sequence of the IR intensities can be arranged from weak to strong or from strong to weak or in random order or according to designer's arrangement. Furthermore, in the present embodiment, the first IR LED 2301 is controlled for emitting IR in the first period T1; the second IR LED 2302 is controlled for emitting IR in the second period T2; the third IR LED 2303 is controlled for emitting IR in the third period T3; and the fourth IR LED 2304 is controlled for emitting IR in the fourth period T4, people having ordinary skill should know that the abovementioned sequence can be changed. For example, the second IR LED 2302 is controlled for emitting IR in the first period T1; the fourth IR LED 2304 is controlled for emitting IR in the second period T2; the third IR LED 2303 is controlled for emitting IR in the third period T3; and the first IR LED 2301 is controlled for emitting IR in the fourth period T4. Thus, the present invention is not limited thereto.

In addition, about the IR receiving, in each of the first period T1, the second period T2, the third period T3 and the fourth period T4, there are three IR LEDs to receive the reflected IR signal such that the distance can be detected by the control circuit 2305. When All of three IR LEDs receive the reflected IR signal, the control circuit 2305 would admittedly determine that this receiving process is an effective receiving process. When one of three IR LEDs or two of three IR LEDs receive the reflected IR signal, the designer can selectively design the control circuit 2305 to determine that this receiving process is an effective receiving process or an ineffective receiving process. If the designer designs that the receiving process is an effective receiving process when at least one of three IR LED receives the reflected IR signal, the position of the IR LED which receives the reflected IR signal can assist to determine the deviation of the position. For example, during the first period T1, the second IR LED 2302 and the fourth IR LED 2304 receives the reflected IR signal of the external object, the control circuit 2305 can determine that the position of the external object may be slightly lower-right. For example, during the first period T1, only the fourth IR LED 2304 receives the reflected IR signal, the control circuit 2104 may determine that the position of the external object is slightly lower-left.

Similarly, a position/gesture identification method can be induced according to the tenth embodiment. However, the difference between the method corresponding to the tenth embodiment and the method corresponding to the eighth embodiment is the fourth IR LED and its corresponding fourth period T4. People having ordinary skill in the art can refer to the seventh embodiment and the ninth embodiment to implement the position/gesture identification method corresponding to the tenth embodiment. Thus, the detail description is omitted.

Eleventh Embodiment

Figure 24:
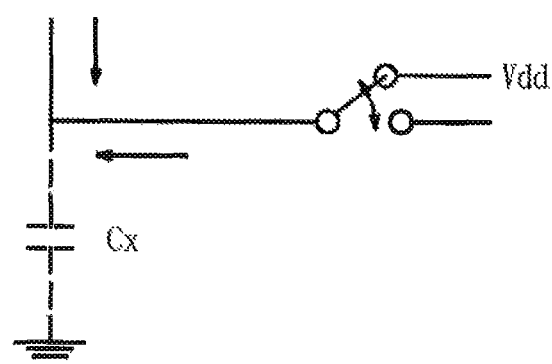
FIG. 24 illustrates a circuit diagram depicting an equivalent circuit for using infrared light emitting diode to detect IR according to the eleventh embodiment of the present invention.

The sixth embodiment to the tenth embodiment describe the implementation method without IR receiver. In this embodiment, to detecting IR signal using IR LED by utilizing photoelectric effect is provided as follow. FIG. 24 illustrates a circuit diagram depicting an equivalent circuit for using infrared light emitting diode to detect IR according to the eleventh embodiment of the present invention. FIG. 25 illustrates a waveform diagram depicting an equivalent circuit for using infrared light emitting diode to detect IR according to the eleventh embodiment of the present invention. Referring to FIG. 24 and FIG. 25, For example, to use IR LED to detect IR signal, a reverse bias may provide to the IR LED 2401, such as to provide a power voltage Vdd to the cathode of the IR LED 2401. Generally, the IR LED 2401 has a stray capacitor Cx. When the IR LED 2401 does not receive IR, please refer to the waveform 2501 which shows the discharge of the cathode of the IR LED 2401, the discharge speed is slower. When the IR LED 2401 receives IR, please refer to the waveform 2502 which shows the discharge of the cathode of the IR LED 2401 when IR is received, the discharge speed is faster. Thus, in this embodiment, a threshold time T25 is set. When the time reaches the threshold time T25, it is determined whether the voltage of the cathode of the IR LED 2401 is lower than the half Vdd (Vdd/2). If the voltage of the cathode of the IR LED 2401 is lower than the half Vdd (Vdd/2), it represents that the IR LED 2401 received IR.

However, people having ordinary skill in the art should know that the designer can selectively design the received or not received criterion, such as the total time from the time when the voltage of the cathode is Vdd to the time when the voltage of the cathode reaches half Vdd. In addition, designer can selectively design to detect the photoelectric current of the IR LED 2401 to determine whether the IR LED 2401 receives IR or not. Further, the reverse bias may not be necessary, such that the bias method may change according to the detecting method. In other word, the reverse bias may not be necessary when the photoelectric current is adopted to determine whether the IR LED 2401 receives IR or not.

In summary, in the present invention, the digital image process in association with the digital image capture is not required. The present invention adopts infrared detection to detect the gesture. In order to accurately identify the motion path of the external object, at least two infrared light emitting diodes are needed. When one of the infrared light emitting diode performs IR emission, the other performs IR receiving. The present invention determines the distances between the external object and the light emitting diodes by emitting infrared with different intensities. Furthermore, in the present invention, time division multiplexing (TDM) is adopted such that the distance between the external object and the first infrared light emitting diode and the distance between the external object and the second infrared light emitting diode can be captured and the position of the external object can be estimated.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A position identification system, comprising:
    a first infrared light emitting diode;
    a second infrared light emitting diode; and
    a control circuit, coupled to the first infrared light emitting diode and the second infrared light emitting diode;
    wherein the control circuit controls the first infrared light emitting diode to emit a plurality of infrared rays with different intensities during a first period, and controls the second infrared light emitting diode to enter a receiving mode to serve as an infrared receiver during the first period,
    wherein the first period is divided into P sub-periods, wherein the first infrared light emitting diode emits the infrared ray with $i^{th}$ intensity during the $i^{th}$ sub-period of the first period,
    wherein, when the second infrared light emitting diode detects a reflected infrared ray from an external object during the $j^{th}$ sub-period of the first period, the control circuit determines the distance between the first infrared light emitting diode and the external object in accordance with $j^{th}$ intensity of the infrared ray emitted by the first infrared light emitting diode,
    wherein the control circuit controls the second infrared light emitting diode to emit a plurality of infrared rays with different intensities during a second period, and controls the first infrared light emitting diode to enter the receiving mode to serve as the infrared receiver during the second period,
    wherein the second period is divided into Q sub-periods, wherein the second infrared light emitting diode emits the infrared ray with $k^{th}$ intensity during the $k^{th}$ sub-period of the second period,
    wherein, when the first infrared light emitting diode detects the reflected infrared ray from the external object during the $m^{th}$ sub-period of the second period, the control circuit determines the distance between the second infrared light emitting diode and the external object in accordance with $m^{th}$ intensity of the infrared ray emitted by the second infrared light emitting diode,
    wherein the control circuit determines the position of the external object in accordance with the distance between the first infrared light emitting diode and the external object and the distance between the second infrared light emitting diode and the external object,
    wherein i, j, k, P, and Q are natural numbers, and $0 \leq i, j \leq P$, $0 \leq k, m \leq Q$.

2. The position identification system according to claim 1, further comprising:
    a third infrared light emitting diode;
    wherein the third infrared light emitting diode, the first infrared light emitting diode and the second infrared light emitting diode are disposed as a triangle,
    wherein the control circuit controls the first infrared light emitting diode to emit the plurality of infrared rays with different intensities during the first period, and the control circuit controls the second infrared light emitting diode and the third infrared light emitting diode to enter the receiving mode to serve as infrared receivers during the first period,
    wherein the first period is divided into P sub-periods, wherein the first infrared light emitting diode emits the infrared with $i^{th}$ intensity during the $i^{th}$ sub-period of the first period,
    wherein, when the second infrared light emitting diode and/or the third infrared light emitting diode detects the reflected infrared ray from the external object during the $j^{th}$ sub-period of the first period, the control circuit determines the distance between the first infrared light emitting diode and the external object in accordance with $j^{th}$ intensity of the infrared ray emitted by the first infrared light emitting diode,
    wherein the control circuit controls the second infrared light emitting diode to emit a plurality of infrared rays with different intensities during the second period, and controls the first infrared light emitting diode and the third infrared light emitting diode to enter the receiving mode to serve as the infrared receivers during the second period,
    wherein the second period is divided into Q sub-periods, wherein the second infrared light emitting diode emits the infrared ray with $k^{th}$ intensity during the $k^{th}$ sub-period of the second period,
    wherein, when the first infrared light emitting diode and/or the third infrared light emitting diode detects the reflected infrared ray from the external object during the $m^{th}$ sub-period of the second period, the control circuit determines the distance between the second infrared light emitting diode and the external object in accordance with $m^{th}$ intensity of the infrared ray emitted by the second infrared light emitting diode,
    wherein the control circuit controls the third infrared light emitting diode to emit a plurality of infrared rays with different intensities during a third period, and controls the first infrared light emitting diode and the second infrared light emitting diode to enter the receiving mode to serve as the infrared receivers during the third period,
    wherein the third period is divided into R sub-periods, wherein the third infrared light emitting diode emits the infrared ray with $n^{th}$ intensity during the $n^{th}$ sub-period of the third period,
    wherein, when the first infrared light emitting diode and/or the second infrared light emitting diode detects the reflected infrared ray from the external object during the $s^{th}$ sub-period of the third period, the control circuit determines the distance between the third infrared light emitting diode and the external object in accordance with $s^{th}$ intensity of the infrared ray emitted by the third infrared light emitting diode, wherein the control circuit determines the position of the external object in accordance with the distance between the first infrared light emitting diode and the external object, the distance between the second infrared light emitting diode and the external object and the distance between the third infrared light emitting diode and the external object, wherein R, n, and s are natural numbers, and 0≤n, s≤R.

3. The position identification system according to claim 1, wherein the control circuit adjusts the intensity of the infrared ray emitting by the first infrared light emitting diode by adjusting a pulse width of a pulse signal supplied to the first infrared light emitting diode, and the control circuit adjusts the intensity of the infrared ray emitting by the second infrared light emitting diode by adjusting a pulse width of a pulse signal supplied to the second infrared light emitting diode.

4. The position identification system according to claim 2, wherein the control circuit adjusts the intensity of the infrared ray emitting by the third infrared light emitting diode by adjusting a pulse width of a pulse signal supplied to the third infrared light emitting diode.

5. The position identification system according to claim 1, wherein the control circuit adjusts the intensity of the infrared ray emitting by the first infrared light emitting diode by adjusting a driving current supplied to the first infrared light emitting diode, and the control circuit adjusts the intensity of the infrared ray emitting by the second infrared light emitting diode by adjusting a driving current supplied to the second infrared light emitting diode.

6. The position identification system according to claim 2, wherein the control circuit adjusts the intensity of the infrared ray emitting by the third infrared light emitting diode by adjusting a driving current supplied to the third infrared light emitting diode.

7. A gesture identification system, comprising:
   a first infrared light emitting diode;
   a second infrared light emitting diode; and
   a control circuit, coupled to the first infrared light emitting diode and the second infrared light emitting diode;
   wherein the control circuit controls the first infrared light emitting diode to emit a plurality of infrared rays with different intensities during a first period, and controls the second infrared light emitting diode to enter a receiving mode to serve as an infrared receiver during the first period,
   wherein the first period is divided into P sub-periods, wherein the first infrared light emitting diode emits the infrared ray with $i^{th}$ intensity during the $i^{th}$ sub-period of the first period,
   wherein, when the second infrared light emitting diode detects a reflected infrared ray from an external object during the $j^{th}$ sub-period of the first period, the control circuit determines the distance between the first infrared light emitting diode and the external object in accordance with $j^{th}$ intensity of the infrared ray emitted by the first infrared light emitting diode,
   wherein the control circuit controls the second infrared light emitting diode to emit a plurality of infrared rays with different intensities during a second period, and controls the first infrared light emitting diode to enter the receiving mode to serve as the infrared receiver during the second period,
   wherein the second period is divided into Q sub-periods, wherein the second infrared light emitting diode emits the infrared ray with $k^{th}$ intensity during the $k^{th}$ sub-period of the second period,
   wherein, when the first infrared light emitting diode detects the reflected infrared ray from the external object during the $m^{th}$ sub-period in the second period, the control circuit determines the distance between the second infrared light emitting diode and the external object in accordance with $m^{th}$ intensity of the infrared ray emitted by the second infrared light emitting diode,
   wherein the control circuit determines the position of the external object in accordance with the distance between the first infrared light emitting diode and the external object and the distance between the second infrared light emitting diode and the external object,
   wherein the control circuit collects a plurality of positions of the external object to determine a movement track of the external object, and then the control circuit determines a gesture in accordance with the movement track of the external object,
   wherein i, j, k, m, P, and Q are natural numbers, and 0≤i, j≤P, 0≤k, m≤Q.

8. The gesture identification system according to claim 7, further comprising:
   a third infrared light emitting diode;
   wherein the third infrared light emitting diode, the first infrared light emitting diode and the second infrared light emitting diode are disposed as a triangle,
   wherein the control circuit controls the first infrared light emitting diode to emit the plurality of infrared rays with different intensities during the first period, and the control circuit controls the second infrared light emitting diode and the third infrared light emitting diode to enter the receiving mode to serve as infrared receivers during the first period,
   wherein the first period is divided into P sub-periods, wherein the first infrared light emitting diode emits the infrared with $i^{th}$ intensity during the $i^{th}$ sub-period of the first period,
   wherein, when the second infrared light emitting diode and/or the third infrared light emitting diode detects the reflected infrared ray from the external object during the $j^{th}$ sub-period of the first period, the control circuit determines the distance between the first infrared light emitting diode and the external object in accordance with $j^{th}$ intensity of the infrared ray emitted by the first infrared light emitting diode,
   wherein the control circuit controls the second infrared light emitting diode to emit a plurality of infrared rays with different intensities during the second period, and controls the first infrared light emitting diode and the third infrared light emitting diode to enter the receiving mode to serve as the infrared receivers during the second period,
   wherein the second period is divided into Q sub-periods, wherein the second infrared light emitting diode emits the infrared ray with $k^{th}$ intensity during the $k^{th}$ sub-period of the second period,
   wherein, when the first infrared light emitting diode and/or the third infrared light emitting diode detects the reflected infrared ray from the external object during the $m^{th}$ sub-period of the second period, the control circuit determines the distance between the second infrared light emitting diode and the external object in accordance with $m^{th}$ intensity of the infrared ray emitted by the second infrared light emitting diode,
   wherein the control circuit controls the third infrared light emitting diode to emit a plurality of infrared rays with different intensities during a third period, and controls the first infrared light emitting diode and the second infrared light emitting diode to enter the receiving mode to serve as the infrared receivers during the third period, wherein the third period is divided into R sub-periods, wherein the third infrared light emitting diode emits the infrared ray with $n^{th}$ intensity during the $n^{th}$ sub-period of the third period, wherein, when the first infrared light emitting diode and/or the second infrared light emitting diode detects the reflected infrared ray from the external object during the $s^{th}$ sub-period of the third period, the control circuit determines the distance between the third infrared light emitting diode and the external object in accordance with $s^{th}$ intensity of the infrared ray emitted by the third infrared light emitting diode, wherein the control circuit determines the position of the external object in accordance with the distance between the first infrared light emitting diode and the external object, the distance between the second infrared light emitting diode and the external object and the distance between the third infrared light emitting diode and the external object, wherein the control circuit collects a plurality of positions of the external object to determine a movement track of the external object, and then the control circuit determines a gesture in accordance with the movement track of the external object, wherein R, n, and s are natural numbers, and $0 \leq n$, $s \leq R$.

9. The gesture identification system according to claim 7, wherein the control circuit adjusts the intensity of the infrared ray emitting by the first infrared light emitting diode by adjusting a pulse width of a pulse signal supplied to the first infrared light emitting diode, and the control circuit adjusts the intensity of the infrared ray emitting by the second infrared light emitting diode by adjusting a pulse width of a pulse signal supplied to the second infrared light emitting diode.

10. The gesture identification system according to claim 8, wherein the control circuit adjusts the intensity of the infrared ray emitting by the third infrared light emitting diode by adjusting a pulse width of a pulse signal supplied to the third infrared light emitting diode.

11. The gesture identification system according to claim 7, wherein the control circuit adjusts the intensity of the infrared ray emitting by the first infrared light emitting diode by adjusting a driving current supplied to the first infrared light emitting diode, and the control circuit adjusts the intensity of the infrared ray emitting by the second infrared light emitting diode by adjusting a driving current supplied to the second infrared light emitting diode.

12. The gesture identification system according to claim 8, wherein the control circuit adjusts the intensity of the infrared ray emitting by the third infrared light emitting diode by adjusting a driving current supplied to the third infrared light emitting diode.

13. A position identification method, comprising:
providing a first infrared light emitting diode;
providing a second infrared light emitting diode;
controlling the first infrared light emitting diode to emit a plurality of infrared rays with different intensities during a first period;
controlling the second infrared light emitting diode to enter a receiving mode to serve as an infrared receiver during the first period;
wherein the first period is divided into P sub-periods, wherein the first infrared light emitting diode emits the infrared ray with $i^{th}$ intensity during the $i^{th}$ sub-period of the first period, determining the distance between the first infrared light emitting diode and an external object in accordance with $j^{th}$ intensity of the infrared ray emitted by the first infrared light emitting diode, when the second infrared light emitting diode detects a reflected infrared ray from the external object during the $j^{th}$ sub-period of the first period;

controlling the second infrared light emitting diode to emit a plurality of infrared rays with different intensities during a second period;

controlling the first infrared light emitting diode to enter the receiving mode to serve as the infrared receiver during the second period;

wherein the second period is divided into Q sub-periods, wherein the second infrared light emitting diode emits the infrared ray with $k^{th}$ intensity during the $k^{th}$ sub-period of the second period, determining the distance between the second infrared light emitting diode and the external object in accordance with $m^{th}$ intensity of the infrared ray emitted by the second infrared light emitting diode, when the first infrared light emitting diode detects the reflected infrared ray from the external object during the $m^{th}$ sub-period of the second period;

determining the position of the external object in accordance with the distance between the first infrared light emitting diode and the external object and the distance between the second infrared light emitting diode and the external object, wherein i, j, k, m, P, and Q are natural numbers, and $0 \leq i$, $j \leq P$, $0 \leq k$, $m \leq Q$.

14. The position identification method according to claim 13, further comprising:
providing a third infrared light emitting diode, wherein the third infrared light emitting diode, the first infrared light emitting diode and the second infrared light emitting diode are disposed as a triangle;
controlling the third infrared light emitting diode to enter the receiving mode to serve as the infrared receiver during the first period;
wherein the first period is divided into P sub-periods, wherein the first infrared light emitting diode emits the infrared with $i^{th}$ intensity during the $i^{th}$ sub-period of the first period, determining the distance between the first infrared light emitting diode and the external object in accordance with $j^{th}$ intensity of the infrared ray emitted by the first infrared light emitting diode, when the second infrared light emitting diode and/or the third infrared light emitting diode detects the reflected infrared ray from the external object during the $j^{th}$ sub-period of the first period;

controlling the third infrared light emitting diode to enter the receiving mode to serve as the infrared receiver during the second period; wherein the second period is divided into Q sub-periods, wherein the second infrared light emitting diode emits the infrared ray with $k^{th}$ intensity during the $k^{th}$ sub-period of the second period, determining the distance between the second infrared light emitting diode and the external object in accordance with $m^{th}$ intensity of the infrared ray emitted by the second infrared light emitting diode, when the first infrared light emitting diode and/or the third infrared light emitting diode detects the reflected infrared ray from the external object during the $m^{th}$ sub-period of the second period;

controlling the third infrared light emitting diode to emit a plurality of infrared rays with different intensities during a third period;

controlling the first infrared light emitting diode and the second infrared light emitting diode to enter the receiving mode to serve as infrared receivers during the third period; wherein the third period is divided into R sub-periods, wherein the third infrared light emitting diode emits the infrared ray with $n^{th}$ intensity during the $n^{th}$ sub-period of the third period, determining the distance between the third infrared light emitting diode and the external object in accordance with $s^{th}$ intensity of the infrared ray emitted by the third infrared light emitting diode, when the first infrared light emitting diode and/or the second infrared light emitting diode detects the reflected infrared ray from the external object during the $s^{th}$ sub-period of the third period;

determining the position of the external object in accordance with the distance between the first infrared light emitting diode and the external object, the distance between the second infrared light emitting diode and the external object and the distance between the third infrared light emitting diode and the external object, wherein R, n, and s are natural numbers, and $0 \leq n$, $s \leq R$.

15. The position identification method according to claim 13, further comprising:

adjusting the intensity of the infrared ray emitting by the first infrared light emitting diode by adjusting a pulse width of a pulse signal supplied to the first infrared light emitting diode; and adjusting the intensity of the infrared ray emitting by the second infrared light emitting diode by adjusting a pulse width of a pulse signal supplied to the second infrared light emitting diode.

16. The position identification method according to claim 14, further comprising:

adjusting the intensity of the infrared ray emitting by the third infrared light emitting diode by adjusting a pulse width of a pulse signal supplied to the third infrared light emitting diode.

17. The position identification method according to claim 13, further comprising:

adjusting the intensity of the infrared ray emitting by the first infrared light emitting diode by adjusting a driving current supplied to the first infrared light emitting diode; and adjusting the intensity of the infrared ray emitting by the second infrared light emitting diode by adjusting a driving current supplied to the second infrared light emitting diode.

18. The position identification method according to claim 14, further comprising:

adjusting the intensity of the infrared ray emitting by the third infrared light emitting diode by adjusting a driving current supplied to the third infrared light emitting diode.

19. A gesture identification method, comprising:

providing a first infrared light emitting diode;

providing a second infrared light emitting diode;

controlling the first infrared light emitting diode to emit a plurality of infrared rays with different intensities during a first period;

controlling the second infrared light emitting diode to enter a receiving mode to serve as an infrared receiver during the first period;

wherein the first period is divided into P sub-periods, wherein the first infrared light emitting diode emits the infrared ray with $i^{th}$ intensity during the $i^{th}$ sub-period of the first period, determining the distance between the first infrared light emitting diode and the external object in accordance with $j^{th}$ intensity of the infrared ray emitted by the first infrared light emitting diode, when the second infrared light emitting diode detects a reflected infrared ray from an external object during the $j^{th}$ sub-period of the first period;

controlling the second infrared light emitting diode to emit a plurality of infrared rays with different intensities during a second period;

controlling the first infrared light emitting diode to enter the receiving mode to serve as the infrared receiver during the second period;

wherein the second period is divided into Q sub-periods, wherein the second infrared light emitting diode emits the infrared ray with $k^{th}$ intensity during the $k^{th}$ sub-period of the second period, determining the distance between the second infrared light emitting diode and the external object in accordance with $m^{th}$ intensity of the infrared ray emitted by the second infrared light emitting diode, when the first infrared light emitting diode detects the reflected infrared ray from the external object during the $m^{th}$ sub-period of the second period;

determining the position of the external object in accordance with the distance between the first infrared light emitting diode and the external object and the distance between the second infrared light emitting diode and the external object;

collecting a plurality of positions of the external object to determine a movement track of the external object; and determining a gesture in accordance with the movement track of the external object, wherein i, j, k, m, P, and Q are natural numbers, and $0 \leq i$, $j \leq P$, $0 \leq k$, $m \leq Q$.

20. The gesture identification method according to claim 19, further comprising:

providing a third infrared light emitting diode, wherein the third infrared light emitting diode, the first infrared light emitting diode and the second infrared light emitting diode are disposed as a triangle;

controlling the third infrared light emitting diode to enter the receiving mode to serve as infrared receivers during the first period;

wherein the first period is divided into P sub-periods, wherein the first infrared light emitting diode emits the infrared with $i^{th}$ intensity during the $i^{th}$ sub-period of the first period, determining the distance between the first infrared light emitting diode and the external object in accordance with $j^{th}$ intensity of the infrared ray emitted by the first infrared light emitting diode, when the second infrared light emitting diode and/or the third infrared light emitting diode detects the reflected infrared ray from the external object during the $j^{th}$ sub-period of the first period;

controlling the third infrared light emitting diode to enter the receiving mode to serve as the infrared receivers during the second period;

wherein the second period is divided into Q sub-periods, wherein the second infrared light emitting diode emits the infrared ray with $k^{th}$ intensity during the $k^{th}$ sub-period of the second period, determining the distance between the second infrared light emitting diode and the external object in accordance with $m^{th}$ intensity of the infrared ray emitted by the second infrared light emitting diode, when the first infrared light emitting diode and/or the third infrared light emitting diode detects the reflect infrared ray from the external object during the $m^{th}$ sub-period of the second period;

controlling the third infrared light emitting diode to emit a plurality of infrared rays with different intensities during a third period;

controlling the first infrared light emitting diode and the second infrared light emitting diode to enter the receiving mode to serve as infrared receivers during the third period;

wherein the third period is divided into R sub-periods, wherein the third infrared light emitting diode emits the infrared ray with $n^{th}$ intensity during the $n^{th}$ sub-period, determining the distance between the third infrared light emitting diode and the external object in accordance with $s^{th}$ intensity of the infrared ray emitted by the third infrared light emitting diode, when the first infrared light emitting diode and/or the second infrared light emitting diode detects the reflected infrared ray from the external object during the $s^{th}$ sub-period of the third period;

determining the position of the external object in accordance with the distance between the first infrared light emitting diode and the external object, the distance between the second infrared light emitting diode and the external object and the distance between the third infrared light emitting diode and the external object;

collecting a plurality of positions of the external object to determine the movement track of the external object; and determining a gesture in accordance with the movement track of the external object, wherein R, n, and s are natural numbers, and $0 \leq n, s \leq R$.

21. The gesture identification method according to claim 19, further comprising:

adjusting the intensity of the infrared ray emitting by the first infrared light emitting diode by adjusting a pulse width of a pulse signal supplied to the first infrared light emitting diode; and adjusting the intensity of the infrared ray emitting by the second infrared light emitting diode by adjusting a pulse width of a pulse signal supplied to the second infrared light emitting diode.

22. The gesture identification method according to claim 20, further comprising:

adjusting the intensity of the infrared ray emitting by the third infrared light emitting diode by adjusting a pulse width of a pulse signal supplied to the third infrared light emitting diode.

23. The gesture identification method according to claim 19, further comprising:

adjusting the intensity of the infrared ray emitting by the first infrared light emitting diode by adjusting a driving current supplied to the first infrared light emitting diode; and adjusting the intensity of the infrared ray emitting by the second infrared light emitting diode by adjusting a driving current supplied to the second infrared light emitting diode.

24. The gesture identification method according to claim 20, further comprising:

adjusting the intensity of the infrared ray emitting by the third infrared light emitting diode by adjusting a driving current supplied to the third infrared light emitting diode.

25. A position identification system, comprising:

a first infrared light emitting diode;

a second infrared light emitting diode;

an infrared receiver; and a control circuit, coupled to the first infrared light emitting diode, the second infrared light emitting diode and the infrared receiver;

wherein the control circuit controls the first infrared light emitting diode to emit a plurality of infrared rays with different intensities during a first period, wherein the first period is divided into P sub-periods, wherein the first infrared light emitting diode emits the infrared ray with $i^{th}$ intensity during the $i^{th}$ sub-period of the first period, wherein, when the infrared receiver detects a reflected infrared ray from an external object during the $j^{th}$ sub-period of the first period, the control circuit determines the distance between the first infrared light emitting diode and the external object in accordance with $j^{th}$ intensity of the infrared ray emitted by the first infrared light emitting diode, wherein the control circuit controls the second infrared light emitting diode to emit a plurality of infrared rays with different intensities during a second period, wherein the second period is divided into Q sub-periods, wherein the second infrared light emitting diode emits the infrared ray with $k^{th}$ intensity during the $k^{th}$ sub-period of the second period, wherein, when the infrared receiver detects the reflected infrared ray from the external object during the $m^{th}$ sub-period of the second period, the control circuit determines the distance between the second infrared light emitting diode and the external object in accordance with $m^{th}$ intensity of the infrared ray emitted by the second infrared light emitting diode, wherein the control circuit determines the position of the external object in accordance with the distance between the first infrared light emitting diode and the external object and the distance between the second infrared light emitting diode and the external object, wherein i, j, k, m, P, and Q are natural numbers, and $0 \leq i, j \leq P, 0 \leq k, m \leq Q$.

26. The position identification system according to claim 25, further comprising:

a third infrared light emitting diode;

wherein the third infrared light emitting diode, the first infrared light emitting diode and the second infrared light emitting diode are disposed as a triangle, wherein the control circuit controls the first infrared light emitting diode to emit the plurality of infrared rays with different intensities during the first period, wherein the first period is divided into P sub-periods, wherein the first infrared light emitting diode emits the infrared with $i^{th}$ intensity during the $i^{th}$ sub-period of the first period, wherein, when the infrared receiver detects the reflected infrared ray from the external object during the $j^{th}$ sub-period of the first period, the control circuit determines the distance between the first infrared light emitting diode and the external object in accordance with $j^{th}$ intensity of the infrared ray emitted by the first infrared light emitting diode, wherein the control circuit controls the second infrared light emitting diode to emit a plurality of infrared rays with different intensities during the second period, wherein the second period is divided into Q sub-periods, wherein the second infrared light emitting diode emits the infrared ray with $k^{th}$ intensity during the $k^{th}$ sub-period of the second period, wherein, when the infrared receiver detects the reflected infrared ray from the external object during the $m^{th}$ sub-period of the second period, the control circuit determines the distance between the second infrared light emitting diode and the external object in accordance with $m^{th}$ intensity of the infrared ray emitted by the second infrared light emitting diode, wherein the control circuit controls the third infrared light emitting diode to emit a plurality of infrared rays with different intensities during a third period, wherein the third period is divided into R sub-periods, wherein the third infrared light emitting diode emits the infrared ray with $n^{th}$ intensity during the $n^{th}$ sub-period of the third period, wherein, when the infrared receiver detects the reflected infrared ray from the external object during the $s^{th}$ sub-period of the third period, the control circuit determines the distance between the third infrared light emitting diode and the external object in accordance with $s^{th}$ intensity of the infrared ray emitted by the third infrared light emitting diode, wherein the control circuit determines the position of the external object in accordance with the distance between the first infrared light emitting diode and the external object, the distance between the second infrared light emitting diode and the external object and the distance between the third infrared light emitting diode and the external object, wherein R, n, and s are natural numbers, and $0 \le n$, $s \le R$.

27. The position identification system according to claim 25, wherein the control circuit adjusts the intensity of the infrared ray emitting by the first infrared light emitting diode by adjusting a pulse width of a pulse signal supplied to the first infrared light emitting diode, and the control circuit adjusts the intensity of the infrared ray emitting by the second infrared light emitting diode by adjusting a pulse width of a pulse signal supplied to the second infrared light emitting diode.

28. The position identification system according to claim 26, wherein the control circuit adjusts the intensity of the infrared ray emitting by the third infrared light emitting diode by adjusting a pulse width of a pulse signal supplied to the third infrared light emitting diode.

29. The position identification system according to claim 25, wherein the control circuit adjusts the intensity of the infrared ray emitting by the first infrared light emitting diode by adjusting a driving current supplied to the first infrared light emitting diode, and the control circuit adjusts the intensity of the infrared ray emitting by the second infrared light emitting diode by adjusting a driving current supplied to the second infrared light emitting diode.

30. The position identification system according to claim 26, wherein the control circuit adjusts the intensity of the infrared ray emitting by the third infrared light emitting diode by adjusting a driving current supplied to the third infrared light emitting diode.

31. A gesture identification system, comprising:
a first infrared light emitting diode;
a second infrared light emitting diode;
an infrared receiver; and
a control circuit, coupled to the first infrared light emitting diode, the second infrared light emitting diode and the infrared receiver;

wherein the control circuit controls the first infrared light emitting diode to emit a plurality of infrared rays with different intensities during a first period, wherein the is divided into P sub-periods, wherein the first infrared light emitting diode emits the infrared ray with $i^{th}$ intensity during the $i^{th}$ sub-period of the first period, wherein, when the infrared receiver detects a reflected infrared ray from an external object during the $j^{th}$ sub-period of the first period, the control circuit determines the distance between the first infrared light emitting diode and the external object in accordance with $j^{th}$ intensity of the infrared ray emitted by the first infrared light emitting diode, wherein the control circuit controls the second infrared light emitting diode to emit a plurality of infrared rays with different intensities during a second period, wherein the second period is divided into Q sub-periods, wherein the second infrared light emitting diode emits the infrared ray with $k^{th}$ intensity during the $k^{th}$ sub-period of the second period, wherein, when the infrared receiver detects the reflected infrared ray from the external object during the $m^{th}$ sub-period of the second period, the control circuit determines the distance between the second infrared light emitting diode and the external object in accordance with $m^{th}$ intensity of the infrared ray emitted by the second infrared light emitting diode, wherein the control circuit determines the position of the external object in accordance with the distance between the first infrared light emitting diode and the external object and the distance between the second infrared light emitting diode and the external object, wherein the control circuit collects a plurality of positions of the external object to determine a gesture in accordance with the movement track of the external object, wherein i, j, k, m, P, and Q are natural numbers, and $0 \le i$, $j \le P$, $0 \le k$, $m \le Q$.

32. The gesture identification system according to claim 31, further comprising:
a third infrared light emitting diode;
wherein the third infrared light emitting diode, the first infrared light emitting diode and the second infrared light emitting diode are disposed as a triangle, wherein the control circuit controls the first infrared light emitting diode to emit the plurality of infrared rays with different intensities during the first period, wherein the first period is divided into P sub-periods, wherein the first infrared light emitting diode emits the infrared with $i^{th}$ intensity during the $i^{th}$ sub-period of the first period, wherein, when the infrared receiver detects the reflected infrared ray from the external object during the $j^{th}$ sub-period of the first period, the control circuit determines the distance between the first infrared light emitting diode and the external object in accordance with $j^{th}$ intensity of the infrared ray emitted by the first infrared light emitting diode, wherein the control circuit controls the second infrared light emitting diode to emit a plurality of infrared rays with different intensities during the second period, wherein the second period is divided into Q sub-periods, wherein the second infrared light emitting diode emits the infrared ray with $k^{th}$ intensity during the $k^{th}$ sub-period of the second period, wherein, when the infrared receiver detects the reflected infrared ray from the external object during the m$^{th}$ sub-period of the second period, the control circuit determines the distance between the second infrared light emitting diode and the external object in accordance with m$^{th}$ intensity of the infrared ray emitted by the second infrared light emitting diode, wherein the control circuit controls the third infrared light emitting diode to emit a plurality of infrared rays with different intensities during a third period, wherein the third period is divided into R sub-periods, wherein the third infrared I emitting diode emits the infrared ray with n$^{th}$ intensity during the n$^{th}$ sub-period of the third period, wherein, when the infrared receiver detects the reflected infrared ray from the external object during the s$^{th}$ sub-period in the third period, the control circuit determines the distance between the third infrared light emitting diode and the external object in accordance with s$^{th}$ intensity of the infrared ray emitted by the third infrared light emitting diode, wherein the control circuit determines the position of the external object in accordance with the distance between the first infrared light emitting diode and the external object, the distance between the second infrared light emitting diode and the external object and the distance between the third infrared light emitting diode and the external object, wherein the control circuit collects a plurality of positions of the external object to determine the movement track of the external object, and then the control circuit determines a gesture in accordance with the movement track of the external object, wherein R, n, and s are natural numbers, and 0≤n, s≤R.

33. The gesture identification system according to claim 31, wherein the control circuit adjusts the intensity of the infrared ray emitting by the first infrared light emitting diode by adjusting a pulse width of a pulse signal supplied to the first infrared light emitting diode, and the control circuit adjusts the intensity of the infrared ray emitting by the second infrared light emitting diode by adjusting a pulse width of a pulse signal supplied to the second infrared light emitting diode.

34. The gesture identification system according to claim 32, wherein the control circuit adjusts the intensity of the infrared ray emitting by the third infrared light emitting diode by adjusting a pulse width of a pulse signal supplied to the third infrared light emitting diode.

35. The gesture identification system according to claim 31, wherein the control circuit adjusts the intensity of the infrared ray emitting by the first infrared light emitting diode by adjusting a driving current supplied to the first infrared light emitting diode, and the control circuit adjusts the intensity of the infrared ray emitting by the second infrared light emitting diode by adjusting a driving current supplied to the second infrared light emitting diode.

36. The gesture identification system according to claim 32, wherein the control circuit adjusts the intensity of the infrared ray emitting by the third infrared light emitting diode by adjusting a driving current supplied to the third infrared light emitting diode.

37. A position identification method, comprising:
providing a first infrared light emitting diode;
providing a second infrared light emitting diode;
providing an infrared receiver; and
controlling the first infrared light emitting diode to emit a plurality of infrared rays with different intensities during a first period;

wherein the first period is divided into P sub-periods, wherein the first infrared light emitting diode emits the infrared ray with i$^{th}$ intensity during the i$^{th}$ sub-period of the first period, determining the distance between the first infrared light emitting diode and the external object in accordance with j$^{th}$ intensity of the infrared ray emitted by the first infrared light emitting diode, when the infrared receiver detects a reflected infrared ray from an external object during the j$^{th}$ sub-period of the first period;

controlling the second infrared light emitting diode to emit a plurality of infrared rays with different intensities during a second period;

wherein the second period is divided into Q sub-periods, wherein the second infrared light emitting diode emits the infrared ray with k$^{th}$ intensity during the k$^{th}$ sub-period of the second period, determining the distance between the second infrared light emitting diode and the external object in accordance with m$^{th}$ intensity of the infrared ray emitted by the second infrared light emitting diode, when the infrared receiver detects the reflected infrared ray from the external object during the m$^{th}$ sub-period of the second period;

determining the position of the external object in accordance with the distance between the first infrared light emitting diode and the external object and the distance between the second infrared light emitting diode and the external object, wherein i, j, k, m, P, and Q are natural numbers, and 0≤i, j≤P, 0≤k, m≤Q.

38. The position identification method according to claim 37, further comprising:
providing a third infrared light emitting diode;
controlling the third infrared light emitting diode to emit a plurality of infrared rays with different intensities during a third period;

wherein the third period is divided into R sub-periods, wherein the third infrared light emitting diode emits the infrared ray with n$^{th}$ intensity during the n$^{th}$ sub-period of the third period, determining the distance between the third infrared light emitting diode and the external object in accordance with s$^{th}$ intensity of the infrared ray emitted by the third infrared light emitting diode, when the infrared receiver detects the reflected infrared ray from the external object during the s$^{th}$ sub-period in the third period;

determining the position of the external object in accordance with the distance between the first infrared light emitting diode and the external object, the distance between the second infrared light emitting diode and the external object and the distance between the third infrared light emitting diode and the external object, wherein R, n, and s are natural numbers, and 0≤n, s≤R.

39. The position identification method according to claim 37, further comprising:
adjusting the intensity of the infrared ray emitting by the first infrared light emitting diode by adjusting a pulse width of a pulse signal supplied to the first infrared light emitting diode; and adjusting the intensity of the infrared ray emitting by the second infrared light emitting diode by adjusting a pulse width of a pulse signal supplied to the second infrared light emitting diode.

40. The position identification method according to claim 38, further comprising:
adjusting the intensity of the infrared ray emitting by the third infrared light emitting diode by adjusting a pulse width of a pulse signal supplied to the third infrared light emitting diode.

41. The position identification method according to claim 37, further comprising:
adjusting the intensity of the infrared ray emitting by the first infrared light emitting diode by adjusting a driving current supplied to the first infrared light emitting diode; and
adjusting the intensity of the infrared ray emitting by the second infrared light emitting diode by adjusting a driving current supplied to the second infrared light emitting diode.

42. The position identification method according to claim 38, further comprising:
adjusting the intensity of the infrared ray emitting by the third infrared light emitting diode by adjusting a driving current supplied to the third infrared light emitting diode.

43. A gesture identification method, comprising:
providing a first infrared light emitting diode;
providing a second infrared light emitting diode;
providing an infrared receiver; and
controlling the first infrared light emitting diode to emit a plurality of infrared rays with different intensities during a first period;
wherein the first period is divided into P sub-periods, wherein the first infrared light emitting diode emits the infrared ray with $i^{th}$ intensity during the $i^{th}$ sub-period of the first period,
determining the distance between the first infrared light emitting diode and an external object in accordance with $j^{th}$ intensity of the infrared ray emitted by the first infrared light emitting diode, when the infrared receiver detects a reflected infrared ray from the external object during the $j^{th}$ sub-period of the first period;
controlling the second infrared light emitting diode to emit a plurality of infrared rays with different intensities during a second period;
wherein the second period is divided into Q sub-periods, wherein the second infrared light emitting diode emits the infrared ray with $k^{th}$ intensity during the $k^{th}$ sub-period of the second period,
determining the distance between the second infrared light emitting diode and the external object in accordance with $m^{th}$ intensity of the infrared ray emitted by the second infrared light emitting diode, when the infrared receiver detects the reflected infrared ray from the external object during the $m^{th}$ sub-period of the second period;
determining the position of the external object in accordance with the distance between the first infrared light emitting diode and the external object and the distance between the second infrared light emitting diode and the external object,
collecting a plurality of positions of the external object to determine a movement track of the external object; and
determining a gesture in accordance with the movement track of the external object,
wherein i, j, k, m, P, and Q are natural numbers, and $0 \leq i$, $j \leq P$, $0 \leq k$, $m \leq Q$.

44. The gesture identification method according to claim 43, further comprising:
providing a third infrared light emitting diode;
controlling the third infrared light emitting diode to emit a plurality of infrared rays with different intensities during a third period;
wherein the third period is divided into R sub-periods, wherein the third infrared light emitting diode emits the infrared ray with $n^{th}$ intensity during the $n^{th}$ sub-period of the third period,
determining the distance between the third infrared light emitting diode and the external object in accordance with $s^{th}$ intensity of the infrared ray emitted by the third infrared light emitting diode, when the infrared receiver detects the reflected infrared ray from the external object during the $s^{th}$ sub-period of the third period;
determining the position of the external object in accordance with the distance between the first infrared light emitting diode and the external object, the distance between the second infrared light emitting diode and the external object and the distance between the third infrared light emitting diode and the external object,
collecting a plurality of positions of the external object to determine the movement track of the external object; and
determining a gesture in accordance with the movement track of the external object,
wherein R, n, and s are natural numbers, and $0 \leq n$, $s \leq R$.

45. The gesture identification method according to claim 43, further comprising:
adjusting the intensity of the infrared ray emitting by the first infrared light emitting diode by adjusting a pulse width of a pulse signal supplied to the first infrared light emitting diode; and
adjusting the intensity of the infrared ray emitting by the second infrared light emitting diode by adjusting a pulse width of a pulse signal supplied to the second infrared light emitting diode.

46. The gesture identification method according to claim 44, further comprising:
adjusting the intensity of the infrared ray emitting by the third infrared light emitting diode by adjusting a pulse width of a pulse signal supplied to the third infrared light emitting diode.

47. The gesture identification method according to claim 43, further comprising:
adjusting the intensity of the infrared ray emitting by the first infrared light emitting diode by adjusting a driving current supplied to the first infrared light emitting diode; and
adjusting the intensity of the infrared ray emitting by the second infrared light emitting diode by adjusting a driving current supplied to the second infrared light emitting diode.

48. The gesture identification method according to claim 44, further comprising:
adjusting the intensity of the infrared ray emitting by the third infrared light emitting diode by adjusting a driving current supplied to the third infrared light emitting diode.

* * * * *